(12) United States Patent
Kamura et al.

(10) Patent No.: US 7,014,256 B2
(45) Date of Patent: Mar. 21, 2006

(54) FLOOR PANEL STRUCTURE OF VEHICLE BODY

(75) Inventors: Takanobu Kamura, Hiroshima (JP); Kenji Murase, Hiroshima (JP); Tsuyoshi Sugihara, Hiroshima (JP); Akinori Utsunomiya, Hiroshima (JP); Kouya Nakagawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/756,826

(22) Filed: Jan. 14, 2004

(65) Prior Publication Data

US 2004/0174046 A1 Sep. 9, 2004

(30) Foreign Application Priority Data

Jan. 16, 2003 (JP) ............................ 2003-008581
Feb. 6, 2003 (JP) ............................ 2003-029513

(51) Int. Cl.
B62D 25/20 (2006.01)

(52) U.S. Cl. .................. 296/193.07; 296/204; 296/191; 296/1.03

(58) Field of Classification Search .......... 296/193.07, 296/204, 1.03, 191, 203.01; 181/207; 267/90, 267/136
See application file for complete search history.

(56) References Cited

U.S. PATENT DOCUMENTS

| | | | | |
|---|---|---|---|---|
| 1,736,548 A * | 11/1929 | Pye | ........................ | 296/193.07 |
| 2,090,459 A * | 8/1937 | Paton | ........................ | 296/191 |
| 4,402,545 A * | 9/1983 | Utsunomiya et al. | ....... | 296/204 |
| 4,572,571 A * | 2/1986 | Malen | .................... | 296/193.07 |
| 4,898,419 A | 2/1990 | Kenmochi et al. | | |
| 5,127,704 A * | 7/1992 | Komatsu | .................... | 296/204 |
| 5,129,700 A * | 7/1992 | Trevisan et al. | ........ | 296/193.07 |
| 6,186,578 B1 * | 2/2001 | Garnier et al. | ........... | 296/146.1 |
| 6,834,912 B1 * | 12/2004 | Cardimen et al. | .......... | 296/204 |
| 6,843,525 B1 * | 1/2005 | Preisler | ................. | 296/193.07 |
| 6,854,791 B1 * | 2/2005 | Jaggi | ..................... | 296/203.01 |
| 6,857,692 B1 * | 2/2005 | Cardimen et al. | .......... | 296/204 |
| 2005/0040677 A1 * | 2/2005 | Kamura et al. | ......... | 296/193.07 |
| 2005/0040678 A1 * | 2/2005 | Kamura et al. | ......... | 296/193.07 |

FOREIGN PATENT DOCUMENTS

| | | |
|---|---|---|
| EP | 1-281-604 | 2/2003 |
| JP | 58-218472 | 12/1983 |
| JP | 59-162366 | 10/1984 |
| JP | 60-047769 | 3/1985 |
| JP | 62-013734 | 1/1987 |

(Continued)

OTHER PUBLICATIONS

Sep. 17, 2004 European Search Report for Application No. EP-04-00-0441.

*Primary Examiner*—H. Gutman
(74) *Attorney, Agent, or Firm*—Nixon Peabody LLP; Donald R. Studebaker

(57) ABSTRACT

A floor panel structure of a vehicle body where a vehicle floor has floor panels with their peripheral edges linked to a plurality of frame members that are disposed in a vehicle body lengthwise direction and a vehicle body crosswise direction and linked to an engine or a suspension is disclosed. The floor panel has a joint where at least part of its peripheral edge is joined to the frame member, a groove formed along the entire length of the joint and a high-rigidity area formed within the low-rigidity area. The low-rigidity area forms a vibration blocking area along the entire length of the joint by using a difference in rigidity from the high-rigidity area.

22 Claims, 24 Drawing Sheets

FOREIGN PATENT DOCUMENTS

| | | | | |
|---|---|---|---|---|
| JP | 404303076 A | * | 10/1992 | ................. 296/204 |
| JP | 405221342 A | * | 8/1993 | ................. 296/204 |
| JP | 406099857 A | * | 4/1994 | ................. 296/204 |
| JP | 406144299 A | * | 5/1994 | ............ 296/203.01 |
| JP | 09-202269 | | 8/1997 | |
| JP | 11-334653 | | 12/1999 | |
| JP | 2001-270470 | | 3/2000 | |
| JP | 2000-335446 | | 12/2000 | |
| JP | 2002-160674 | | 6/2002 | |

* cited by examiner

1 × 2 MODE

2 × 2 MODE

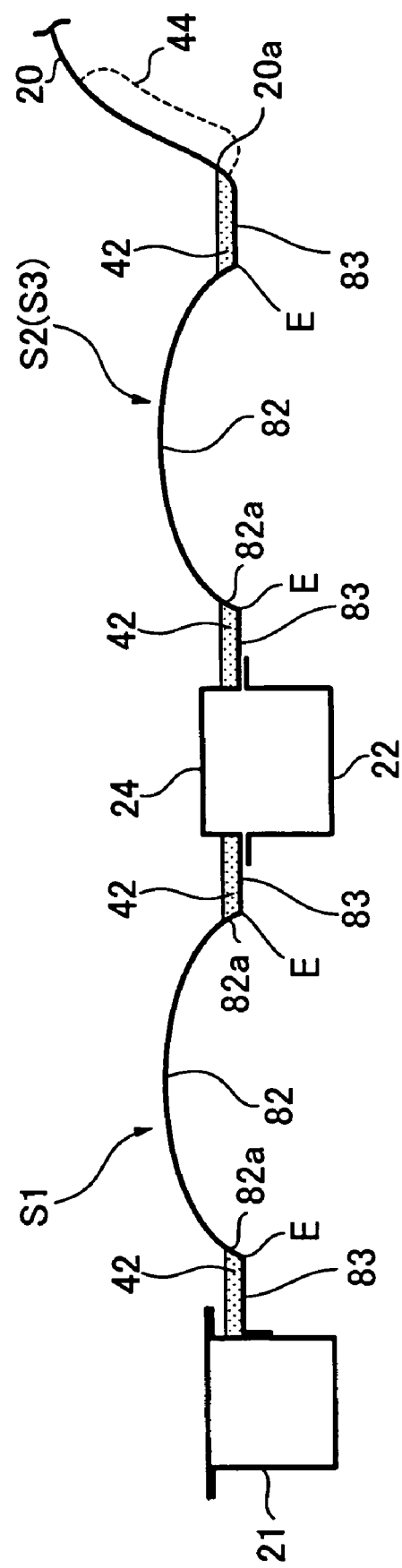

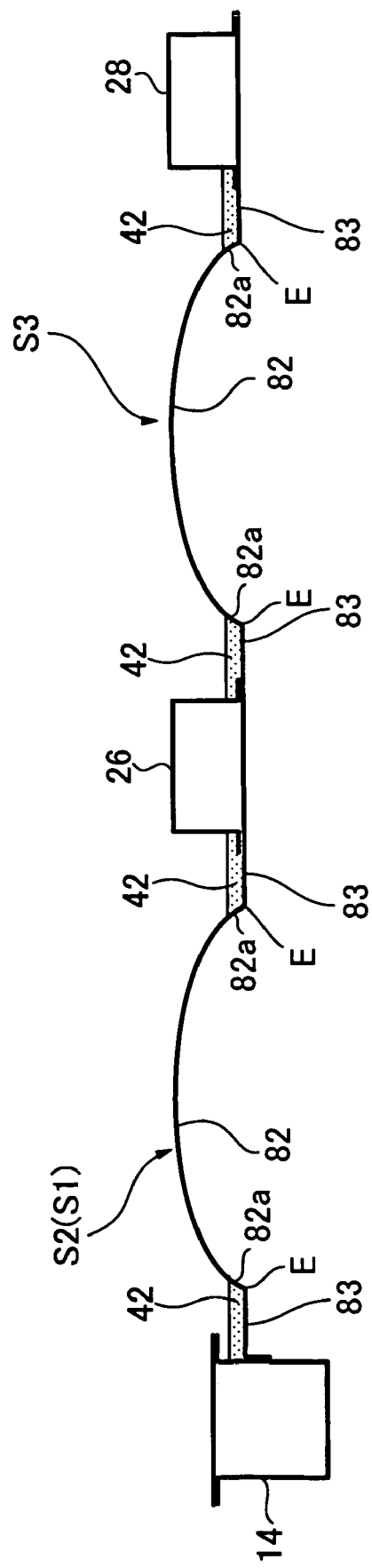

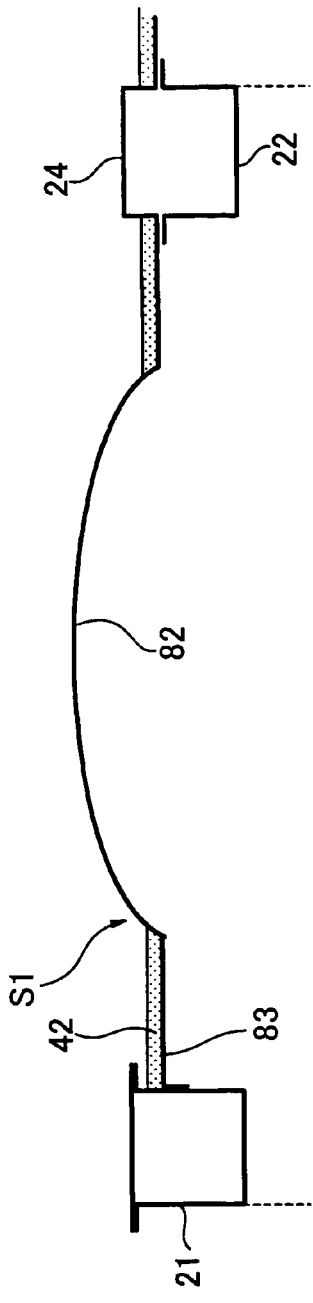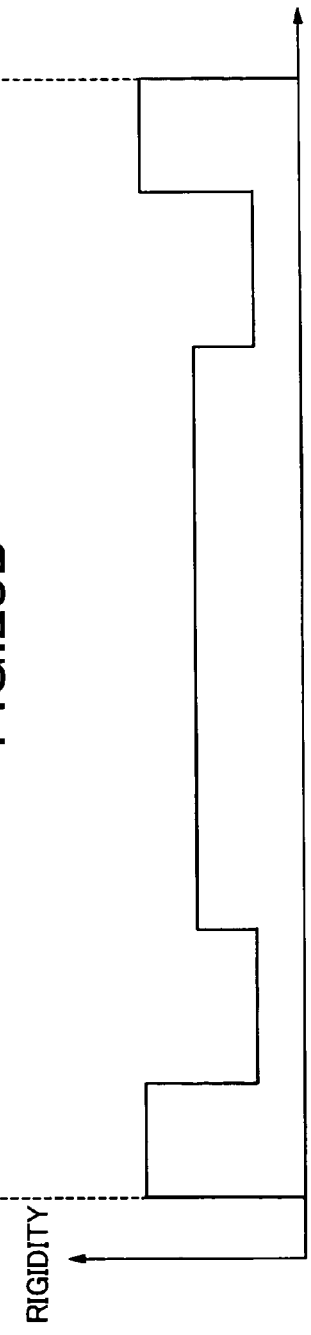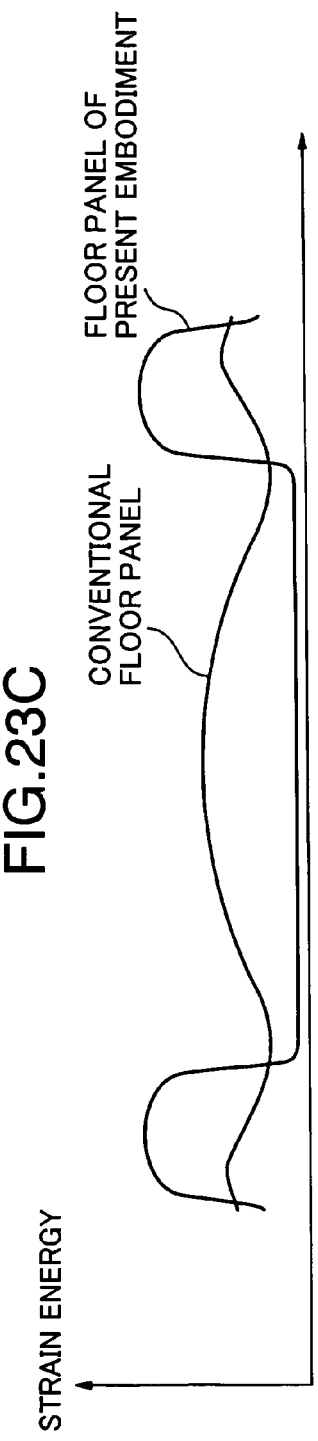

FLOOR PANEL STRUCTURE OF VEHICLE BODY

BACKGROUND OF THE INVENTION

1. Field of the Invention

The present invention relates to the floor panel structure of a vehicle body and particularly to the floor panel structure of a vehicle body where the floor of an vehicle has floor panels linked to a plurality of frame members that are disposed in the vehicle body lengthwise direction and the vehicle body crosswise direction and linked to an engine or a suspension.

2. Conventional Art

Vibration from frame members linked to the engine or suspension is known to be transmitted to floor panels, causing these floor panels to vibrate and as a result, the air within the passenger cabin vibrates greatly, thus generating unpleasant in-cabin vibrations and noise.

In this case, the source of vibration causing the problem may be vibration from the engine itself or road noise transmitted from the suspension, while the road noise typically includes components due to resonance of the tire cavity and components due to resonance of the suspension.

Typical measures conventionally taken to suppress the vibration and noise include applying vibration-damping materials and vibration-suppressing materials as various vibration-damping and vibration suppression measures. While it is possible to reduce vibration and noise in this manner, an extremely large amount of vibration-damping material and vibration-suppressing material is required, thus increasing the vehicle weight and leading to various deleterious effects and becoming a major problem on the cost side.

Moreover, the unpleasant vibration transmitted from the engine and suspension is mainly below 400 Hz in a vehicle, and in particular, has a peak near 250 Hz, which is the frequency of road noise arising from tire cavity resonance. Thus, a technique is known by which a plurality of beads is formed in the floor panels, thus increasing the panel thickness and raising its rigidity, thereby shifting the natural frequency of the floor panel to a high band higher than 400 Hz. In other words, an attempt is made to prevent the floor panel from resonating at the resonance frequency of the suspension and the tire cavity resonance frequency band, thus reducing unpleasant vibration and noise.

In this case, while this has the advantage of being able to suppress resonance peaks in low-frequency regions, vibration in the high-pitched regions conversely increases, so it becomes necessary to use large amounts of vibration-damping materials and vibration-suppressing materials in order to suppress vibration and noise in the high-frequency regions. In this manner, even in this case, the vehicle weight is increased as described above so there are various deleterious effects and problems on the cost side, so it is desirable to solve this problem.

Thus, the present inventors focused on the relationship between the frequencies and vibration modes of vibrations transmitted to the floor and proposed a structure of a floor panel that has vibration modes wherein the acoustic emission level is smaller at specific vibration frequencies (resonance regions) (see Japanese Patent Unexamined Publication No. JP-A-9-202269). The floor panel structure is one wherein the specific frequencies are frequencies near the 250 Hz of road Fnoise arising from the tire cavity resonance transmitted to the floor panel as the most unpleasant vibration, and so the rigidity of the floor panel is partially adjusted so that the vibration mode of the floor panel becomes a vibration mode such as a 2×2 mode or 2×1 mode where an even number of vibration antinodes is generated, and thus with a setup where the sound waves radiated from the respective vibration antinodes cancel each other, it is possible to reduce the acoustic emission level and reduce noise within the cabin.

However, in the case in which vibration-damping materials and vibration-suppressing materials are attached to the entire surface of the floor panel as described above, there are problems of increased materials costs and increased vehicle weight. In addition, if the panel thickness is increased, there is also a problem of increased vehicle weight.

In addition, with the floor panel structure recited in JP-A-9-202269 above, while effective in reducing the noise in specific frequency regions, it is difficult to reduce noise in frequencies outside those specific frequency regions at the same time, so there is a problem in that in order to reduce vibration in a wide range of frequency bands at the same time, it is necessary to apply vibration-suppressing material to the entire surface of the floor panel, thus increasing the vehicle weight.

Here, the present inventors took note of the fact that vibration from the engine and vibration from the suspension (road noise), which are the main causes of the most unpleasant in-cabin vibrations and noise, are transmitted to the floor panel via the frame members of the body and that their vibration damping effect is greater the larger the deformation of the vibration-suppressing material and thus attempted to solve the aforementioned problems with the conventional art.

SUMMARY OF THE INVENTION

Thus, the present invention has as an object to provide the floor panel structure of a vehicle body that is able to reduce the amount of vibration itself transmitted from the frame members of the body to panel areas that account for the majority of the floor panel.

Moreover, the present invention has as an object to provide the floor panel structure of a vehicle body that is able to greatly reduce the floor panel vibration arising due to vibration transmitted from the frame members of the body to the floor panel, thereby achieving a reduction in noise within the cabin and reduced vehicle weight.

In order to achieve the above objects, the present invention provides a floor panel structure of a vehicle body where a vehicle floor has floor panels with peripheral edges thereof linked to a plurality of frame members that are disposed in a vehicle body lengthwise direction and a vehicle body crosswise direction and linked to an engine or a suspension, the floor panel comprising a joint where at least part of peripheral edge thereof is joined to the frame member, a low-rigidity area formed along the entire length of the joint and a high-rigidity area formed within the low-rigidity area, wherein the low-rigidity area forms a vibration blocking area along the entire length of the joint by using a difference in rigidity from the high-rigidity area.

According to the present invention mentioned above, the low-rigidity area and the high-rigidity area are formed in the floor panel and the low-rigidity area forms a vibration blocking area along the entire length of the joint by using the difference in rigidity from the high-rigidity area, so vibrations transmitted from the frame members to the high-rigidity portion of the floor panel are reduced or blocked by the vibration blocking area. As a result, the present invention can reduce noise within the vehicle cabin.

In a preferred embodiment, the floor panel joint is formed around the entire peripheral edge area of the floor panel and the low-rigidity area of the floor panel is formed continuously over the entire length of the joint.

According to the embodiment mentioned above, the vibrations transmitted from the frame members to the high-rigidity area of the floor panel are reliably reduced or blocked.

In a preferred embodiment, a side area on the vehicle body inside of the floor panel does not have the joint and the low-rigidity area formed but is formed as a unit with a floor tunnel area protruding upward from the vehicle body where none of the frame members are provided.

Here, when the low-rigidity area is formed in the floor panel, for example, it may be necessary to add control of the elongation or deformation of sheet metal so press-forming may no longer be easily performed. However, according to the embodiment mentioned above, the low-rigidity areas are not formed on the side area of the floor panel, so they can be easily formed as a unit with the floor tunnel area. In addition, the frame members are not provided on the floor tunnel area, so it is not connected directly to either the engine or the suspension, so vibration from the engine or suspension is not easily transmitted via the floor tunnel area to the floor panel area and thus there is no need to provide a low-rigidity area. Moreover, one side area of the floor panel is formed as a unit with the floor tunnel area which is not provided with frame members, but no low-rigidity area is formed, thus preventing reduced vehicle-body rigidity or reduced rigidity of panel areas which cause deleterious effects on the feeling of comfort when stepping on the floor.

In a preferred embodiment, the floor panel is formed such that the region between the joint and the low-rigidity area is substantially absent.

According the embodiment mentioned above, in order to make the region between the joint with the frame member and the low-rigidity area of the floor panel, which is the source of transmission of floor panel vibrations, essentially absent, the surface area of the flat panel portions that emit large amounts of sound is eliminated or made small, so it is possible to prevent the occurrence of noise due to acoustic emission from the panel portions.

In a preferred embodiment, the low-rigidity area of the floor panel is formed such that rigidity thereof is substantially constant over the entire length of the joint with the frame member.

According to the embodiment mentioned above, the vibration modes all around the low-rigidity area become constant so the vibration of the low-rigidity area or the vibration blocking area caused by transmitted vibrations can be made uniform, and thus the vibration blocking effect upon the high-rigidity area can be further increased so the vibrations can be efficiently damped.

In a preferred embodiment, the low-rigidity area of the floor panel is formed in a linear manner corresponding to the frame member.

According to the embodiment mentioned above, the low-rigidity area is easily deformed so vibrations can be even more effectively reduced or blocked. Moreover, according to the embodiment, in the same manner as the aforementioned case in which the rigidity of the low-rigidity area is made constant, the vibration modes all around the low-rigidity area become constant so the same effects can be evinced.

In a preferred embodiment, the present invention further comprises damping material provided only in the low-rigidity area or only in the low-rigidity area and its vicinity.

According to the embodiment mentioned above, the damping material is provided only in the low-rigidity area or only in the low-rigidity area and its vicinity, so the vibration damping effect of the damping material is strongly exhibited. Accordingly, the vibration transmitted from the frame members to the high-rigidity area of the floor panel can be effectively damped. In addition, by providing damping material only in the low-rigidity area or only in the low-rigidity area and its vicinity, it is possible to obtain the same level of vibration damping effect with a smaller amount of damping material than when damping material is provided over the entire floor panel, so the vehicle body can be made lighter and costs can be reduced. Conversely, a larger vibration damping effect can be obtained with the same amount of damping material.

In a preferred embodiment, the floor panel structure further comprises first damping material provided in the low-rigidity area of the floor panel, and second damping material provided in the high-rigidity area of the floor panel, the damping performance of the first damping material being greater than that of the second damping material.

According to the embodiment mentioned above, the damping effect is exhibited strongly in the low-rigidity area where vibration energy is concentrated. In addition, the first damping material in the low-rigidity area is installed such that it mainly blocks vibration transmitted from the frame members, while the second damping material in the high-rigidity area is installed such that it mainly prevents sound transmission, so it is possible to reduce noise and vibration within the cabin extremely effectively. As a result, the second damping material can be used mainly to prevent sound transmission so the amount of the second damping material used can be reduced.

In a preferred embodiment mentioned above, the low-rigidity area of the floor panel is grooves or beads protruding downward, and the high-rigidity area of the floor panel is a flat panel area occupying the majority of the floor panel.

According to the embodiment mentioned above, the vibration transmitted from the frame members to the flat panel area occupying the majority of the floor panel can be effectively damped with the simple structure.

In a preferred embodiment, the vibration blocking area of the floor panel reduces the transmission of vibrations above a predetermined frequency, and the high-rigidity area of the floor panel has a vibration mode adjusting area that vibrates in a 2×1 vibration mode at a first specific frequency below the predetermined frequency so as to suppress the generation of acoustic emissions.

According to the embodiment mentioned above, by setting the predetermined frequency and above so as to include, for example, the frequencies of road noise due to tire cavity resonance and also setting the first specific frequency below the predetermined frequency to be the frequency of road noise due to resonance of the suspension, it is possible to reduce both road noise due to tire cavity resonance and road noise due to resonance of the suspension, and as a result it is possible to reduce noise within the cabin.

In a preferred embodiment, the predetermined frequency is approximately 200 Hz.

According to the embodiment mentioned above, it is possible to reduce road noise at frequencies of mainly 200 Hz to 300 Hz due to tire cavity resonance and at frequencies below 200 Hz due to resonance of the suspension.

In a preferred embodiment, the low-rigidity areas of the floor panel are beads, these beads define regions of the vibration mode adjusting area, and the vibration blocking area including the bead and the vibration mode adjusting area is formed as a unit.

According to the embodiment mentioned above, it is possible to form the vibration blocking structure and the vibration mode adjusting structure as a unit by means of press forming.

In a preferred embodiment, the high-rigidity area of the floor panel is a curved surface formed protruding upwards or downwards, the low-rigidity area of the floor panel is a flat planar area, and damping material is provided only in the planar area of the floor panel.

According to the embodiment mentioned above, by using the difference in rigidity between the curved surface and planar area, vibration is reflected at the boundary where the rigidity changes, and the flat area with low rigidity vibrates strongly and stops vibration, and the like, vibration is blocked at the planar area so that vibration in a wide frequency range, e.g. 400 Hz or lower, transmitted from the frame members to the floor panel is reduced. Moreover, damping material is provided on the planar area of the floor panel so vibrations on the planar area that vibrates strongly are reduced. In addition, damping material is provided only in the planar area of the floor panel so vibration of the floor panel can be greatly reduced with lightweight damping material and the same or greater level of vibration damping effect can be obtained with a smaller amount of damping material than conventionally used, so the vehicle body can be made lighter and costs can be reduced and also noise within the cabin can be reduced even further.

In a preferred embodiment, the high-rigidity area of the floor panel is a curved surface formed protruding upwards or downwards, the low-rigidity area of the floor panel is a flat planar area, damping material is provided in the planar area and curved surface of the floor panel, and the damping material is provided in larger quantities upon the planar area than the curved surface.

According to the embodiment mentioned above, by using the difference in rigidity between the curved surface and planar area, vibration is blocked at the planar area so that vibration in a wide frequency range, e.g. 400 Hz or lower, transmitted from the frame members to the floor panel is reduced. Moreover, damping material is provided on the planar area of the floor panel so vibrations on the planar area that vibrates strongly are further reduced. In addition, damping material is provided only in the planar area of the floor panel so vibration of the floor panel can be greatly reduced with lightweight damping material and the same or greater level of vibration damping effect can be obtained with a smaller amount of damping material than conventionally used, so the vehicle body can be made lighter and costs can be reduced and also noise within the cabin can be reduced even further.

In a preferred embodiment, the curved surface of the floor panel is formed such that a boundary thereof with the planar area is substantially circular or substantially elliptical in shape.

According to the embodiment mentioned above, the rigidity of the curved surface can be effectively increased while keeping the height of the curved surface low. As a result, the height of protrusion into the cabin can be kept low so it is easy to place floor mats or the like within the cabin. The height of protrusion downward is also kept low so it is possible to greatly reduce vibration of the floor panel while preventing interference with a fuel tank or the like that may be provided below the floor.

In a preferred embodiment, it is preferable that one curved surface of the floor panel is provided in a region enclosed by the plurality of frame members.

According to the embodiment mentioned above, the planar area vibrates more readily so the vibration of the floor panel can be more effectively reduced.

In a preferred embodiment, the curved surface and planar area of the floor panel function as a vibration mode adjusting area that causes the region enclosed by the plurality of frame members to vibrate in a 2×1 vibration mode at a second specific frequency.

According to the embodiment mentioned above, the vibration mode adjusting area can reduce noise at the second specific frequency and at the same time reduce vibration at frequencies other than the second specific frequency. Moreover, even in the case in which a vibration mode adjusting area is provided, there is no need to apply damping material over the entire surface of the floor panel, thus preventing the weight of the vehicle body from increasing.

In a preferred embodiment, the second specific frequency is the tire cavity resonance frequency.

According to the embodiment mentioned above, it is possible to greatly reduce acoustic emission due to vibration from tire cavity resonance.

In a preferred embodiment, the second specific frequency is approximately 250 Hz.

According to the embodiment mentioned above, it is possible to greatly reduce acoustic emission due to vibration at approximately 250 Hz.

In a preferred embodiment, the planar area of the floor panel is linked to the frame member or formed as a unit with a floor tunnel area, and the curved surface of the floor panel is formed protruding upward; furthermore the side surface of the frame member or the rising area of the floor tunnel area, the planar area, and the rising area of the curved surface are formed as groove shapes, and the interior of the groove shapes are coated with the damping material.

According to the embodiment mentioned above, the damping material can be easily coated.

In a preferred embodiment, the damping material is respectively adhered to the side surface of the frame member or the rising area of the floor tunnel area, the planar area, and the rising area of the curved surface.

According to the embodiment mentioned above, the effect of the damping material can be more strongly exhibited.

In a preferred embodiment, sound-absorbing material is provided on the curved surface.

According to the embodiment mentioned above, it is possible to further prevent acoustic emission by sound transmission.

The above and other objects and features of the present invention will be apparent from the following description by taking reference with accompanying drawings employed for predetermined embodiments of the present invention.

BRIEF DESCRIPTION OF THE DRAWINGS

In the accompanying drawings:

FIG. 21 is a sectional view showing the sectional structure of the floor panel in the vehicle crosswise direction along A—A of FIG. 19;

FIG. 22 is a sectional view showing the cross-sectional structure of the floor panel in the vehicle body lengthwise direction along B—B of FIG. 19;

FIGS. 23A, 23B, and 23C are schematic sectional views of a floor panel, a plot of rigidity and a plot of the strain energy distribution according to the second embodiment;

DESCRIPTION OF THE PREFERRED EMBODIMENTS

A first embodiment of the present invention will now be explained with reference to the appended drawings.

Figure 1:
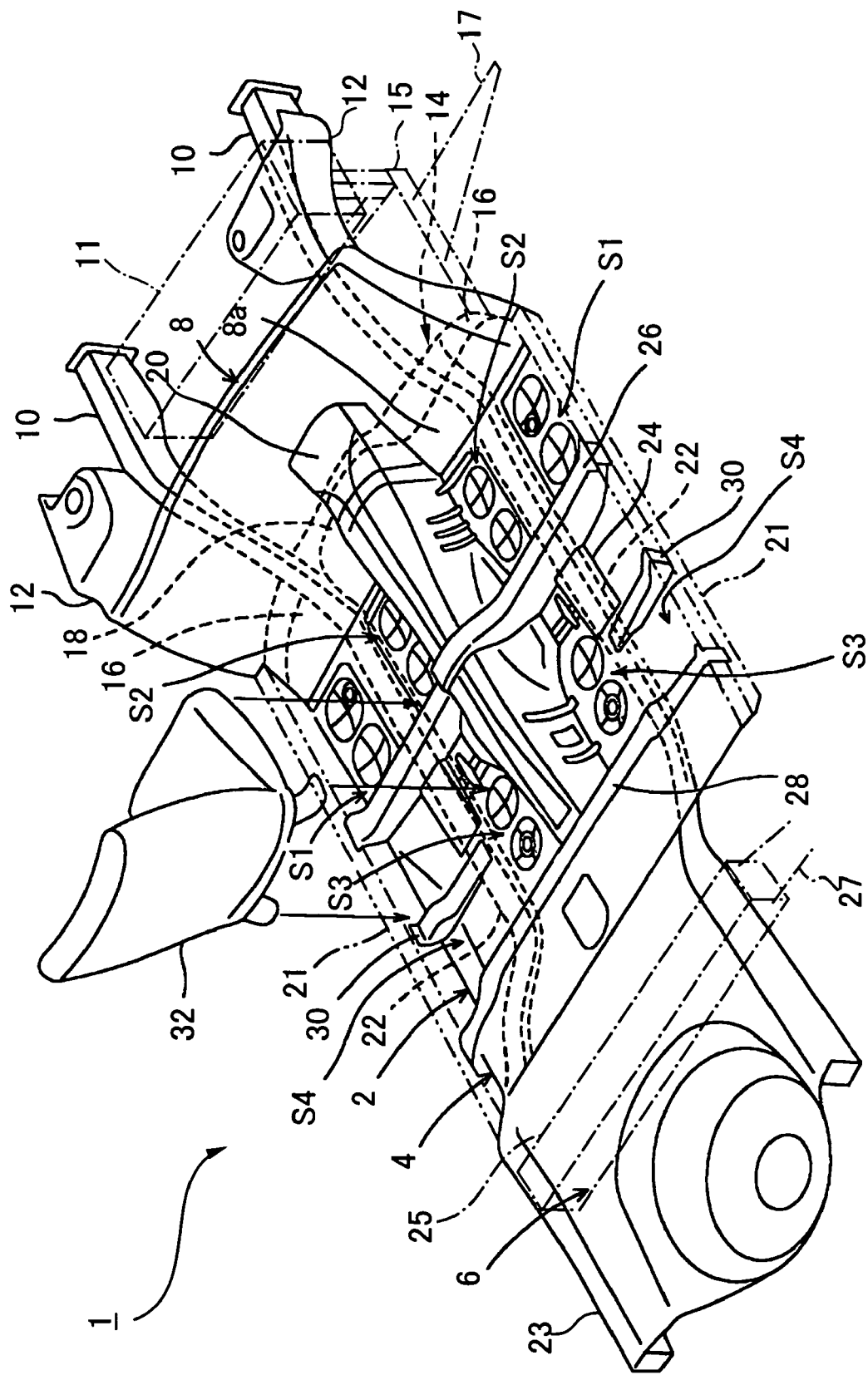
FIG. 1 is a perspective view of the underbody of a vehicle having the floor panel structure of a vehicle body according to a first embodiment of the present invention.
Figure 2:
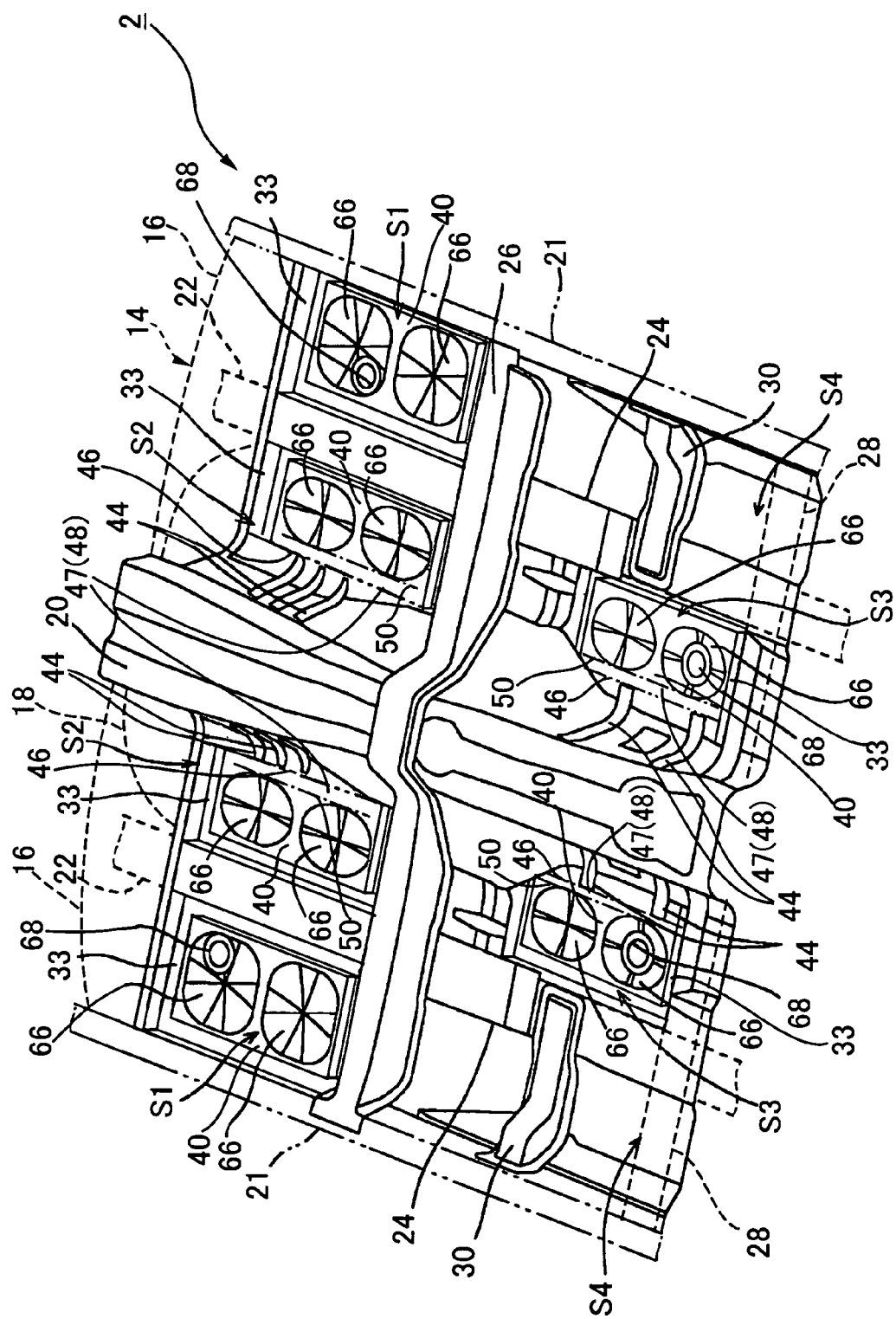
FIG. 2 is a perspective view showing the floor panel structure of a vehicle body according to the first embodiment of the present invention.

FIG. 1 is a perspective view of the underbody of a vehicle having the floor panel structure of a vehicle body according to the first embodiment of the present invention. FIG. 2 is an enlarged perspective view of the floor panel.

As shown in FIG. 1, a vehicle underbody 1 includes a front floor panel 2 constituting the floor portion of the vehicle cabin, a center floor panel 4 located at a position higher than and behind the front floor panel 2 (in the vehicle body direction) and on which is disposed the rear seats (not shown), and also a rear floor panel 6 constituting the floor portion of the trunk located at a position higher than and behind the front floor panel 2 (in the vehicle body direction).

In addition, the bottom edge of a dash panel 8 serving as a partition between the vehicle cabin and engine compartment is attached by spot-welding or other method to the front edge of the front floor panel 2 (in the vehicle body direction). Moreover, pairs of each of the front side frame 10 and fender apron 12 are provided on the front of the dash panel 8 so as to enclose the left and right sides of the engine compartment. An engine 11 is removably mounted to the front side frame 10 via elastic mounts (not shown).

Attached to the incline 8a, which is the lower portion of the dash panel 8, is the No. 1 cross member 14 which is a crosswise reinforcing member. The No. 1 cross member 14 includes a pair of torque box members 16 provided on the vehicle body outside of each front side frame 10 and having a closed cross-sectional structure wherein their flanges are joined to the front side frame 10 and the incline 8a of the dash panel 8, and a dash lower cross member 18 disposed that it is sandwiched between the pair of front side frames 10 with either end joined to a front side frame 10.

A front suspension cross member 15 is attached to the No. 1 cross member 14 and pair of front side frames 10, and the front suspension 17 is attached to the front suspension cross member 15.

As shown in FIG. 1 and FIG. 2, the front floor panel 2 was press-formed from steel sheet of a stipulated thickness (e.g.

0.65–0.7 mm thick), while the floor tunnel 20, which bulges upward at a position roughly in the center of the vehicle in the vehicle crosswise direction, extends in the vehicle body lengthwise direction. In addition, the vehicle's side body pieces (not shown) are attached to either edge of the front floor panel 2 in the vehicle crosswise direction, respectively. At the lower edges of the side body pieces, side sills 21 (indicated by phantom lines) with a closed cross-sectional structure extend in the vehicle body lengthwise direction, and the side sills 21 are joined to the front floor panel 2 by spot-welding or another method. The front part of these side sills 21 are joined to the No. 1 cross member 14.

Moreover, intermediate between the floor tunnel 20 and side sills 21 is provided a pair of floor side frames 22 such that each extends in the vehicle body lengthwise direction. The front ends of these floor side frames 22 are connected to the rear ends of the front side frames 10 described above and their rear ends are connected to rear side frames 23. The floor side frames 22 have a generally rectangular closed cross section constituted by overlapping members made of steel sheet with a square C-shaped cross section. In order to maintain the closed cross sectional area, a protrusion 24 that protrudes upward is formed on the front floor panel 2, and the protrusion 24 extends in the lengthwise direction from the front edge of the front floor panel 2 to a predetermined location behind the center position in the vehicle body lengthwise direction.

Moreover, a rear suspension cross member 25 is attached to the rear side frames 23 and the rear suspension 27 is attached to the rear suspension cross member 25.

Specifically, as reinforcing structures in the vehicle body lengthwise direction, the front floor panel 2 is provided with side sills 21 on both the left and right sides along with the floor side frames 22 and a protrusion 24 roughly intermediate between the floor tunnel 20 and side sills 21. Thereby, the vehicle body can be given adequate bending rigidity and torsion rigidity and also, deformation of the cabin particularly in a vehicle head-on collision can be minimized so that the passengers can be protected reliably.

Moreover, as reinforcing structures in the vehicle body crosswise direction, in addition to the No. 1 cross member 14 described above, there are also provided a No. 2 cross member 26 extending in the vehicle body crosswise direction such that it straddles the floor tunnel 20 at nearly the center of the front floor panel 2 in the vehicle body lengthwise direction, and a No. 3 cross member 28 extending in the vehicle body crosswise direction at the rear end of the front floor panel 2. The No. 2 cross member 26 is a member with a downward-opening C-shaped cross section joined to the upper surface of the front floor panel 2, with the portion roughly in the center in the vehicle body crosswise direction being bent upward to match the shape of the floor tunnel 20, while its left and right ends are joined to the respective side sills 21. In addition, the No. 3 cross member 28 is a member with a downward-opening C-shaped cross section joined to the upper surface of the front floor panel 2, with its left and right ends joined to the respective side sills 21, and also portions thereof are joined to the floor side frames 22.

With the constitution described above, the floor having front floor panel (floor panel) 2 is made up of eight floor panels S1, S2, S3 and S4 which are rectangular or generally rectangular in shape, being each surrounded by the floor tunnel 20 extending in the vehicle body lengthwise direction, the floor side frames 22 (including the protrusion 24) and the side sills 21, along with the various cross members 14, 26 and 28 each extending in the vehicle body crosswise direction.

Thus, vibrations from the front suspension and engine are transmitted via the floor side frames 22 to the No. 1 cross member 14. In addition, vibrations from the rear suspension are transmitted via the floor side frames 22 to No. 3 cross member 28. Furthermore, these vibrations are transmitted via the side sills 21 to the No. 2 cross member 26, and the vibrations in the floor side frames 22, fender apron 12 and the various cross members 14, 26 and 28 are transmitted to the floor panels S1, S2, S3 and S4. As described later, the embodiments of the present invention are intended to reduce the vibrations transmitted from the floor side frames 22, side sills 21, No. 1 cross member 14, No. 2 cross member 26 and No. 3 cross member 28 to the floor panels S1, S2 and S3.

Hereinafter, the side sills 21, floor side frames 22 (including protrusion 24), No. 1 cross member 14, No. 2 cross member 26 and No. 3 cross member 28 are referred to collectively as frame members.

As shown in FIG. 2, the first floor panel S1 is press-formed alone by itself, and all four of its edges are joined by welding to the insides of the floor side frame 22, side sill 21, No. 1 cross member 14 and No. 2 cross member 26 along both the left and right sides of the floor tunnel 20.

The second floor panel S2 is press-formed as a unit with the floor tunnel 20, being positioned toward the vehicle body inside of the first floor panels S1 on both sides, and three of its edges are joined by welding to the insides of the floor side frame 22 (including the protrusion 24), No. 1 cross member 14 and No. 2 cross member 26 along both the left and right sides of the floor tunnel 20.

The third floor panel S3 is press-formed as a unit with the floor tunnel 20 and is positioned toward the vehicle body rear side of the second floor panel S2. Three of the edges of the third floor panel S3 are joined by welding to the insides of the floor side frame 22 (including the protrusion 24), No. 2 cross member 26 and No. 3 cross member 28. A reinforcing member 30 reaching from the floor side frame 22 to the side sill 21 is provided on the vehicle body outside of these third floor panels S3.

Note that as shown in FIG. 1, the reinforcing member 30 also serves as the mounting bracket for the front seat 32, where the two front legs of the front seat 32 are coupled to No. 2 cross member 26, one of the rear legs is coupled to the reinforcing member 30 and the other leg is coupled to the floor tunnel 20.

The fourth floor panel S4 is press-formed as a unit with the floor tunnel 20, being positioned toward the vehicle body rear side of the first floor panels S1, and three of its edges are connected to the insides of the No. 2 cross member 26, side sills 21 and No. 3 cross member 28, and part of one edge is joined by welding to the floor side frames 22.

Here follows a detailed description of the floor panel structure of a vehicle body according to the first embodiment of the present invention made with reference to FIG. 2 and FIG. 3.

As described above, the vibrations transmitted from the engine and suspension to the frame members are at 400 Hz or less, and among these, road noise due to tire cavity resonance has a frequency peak at 200–300 Hz. The peak frequency differs depending on the tire size, specifications, weight, air pressure and other factors, and it is conceivable that the structure of the vehicle may be adjusted to match a different peak frequency for each tire. However, this is not realistic so in the embodiment, by providing a vibration reducing structure (vibration blocking area) for each of the floor panels S1, S2 and S3, vibration blocking is performed mainly on vibrations with a frequency of 250 Hz and also reducing vibrations in a wide-range frequency band above 200 Hz (namely, 200 Hz to 300 Hz).

The vibration reducing structure provided in first floor panel S1 will be described with reference to FIG. 2 and FIG. 3. As described above, the first floor panel S1 is provided within a space formed by the No. 1 cross member 14, side sills 21, No. 2 cross member 26 and floor side frames 22, the first floor panel S1 is joined by welding to these frame members and the vibration blocking area is formed along the entire length of the joints with these frame members. More specifically, in first floor panel S1, the vibration blocking area is a groove 33 formed linearly substantially in the shape of a square along its front edge, vehicle body outside edge, rear edge and vehicle body inside edge.

Figure 3A:
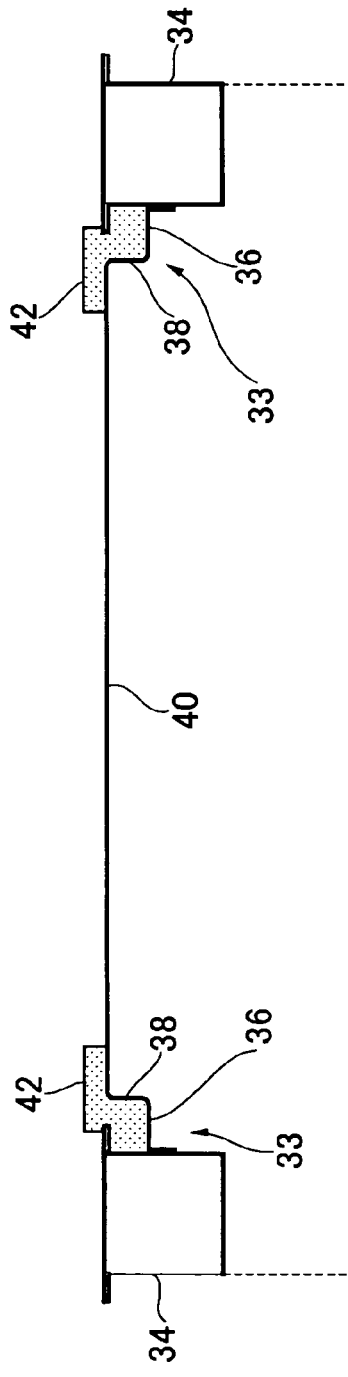
FIGS. 3A, 3B and 3C are schematic sectional views of a floor panel with the vibration reducing structure, a plot of rigidity and a plot of the strain energy distribution according to the first embodiment.

FIG. 3A schematically illustrates the cross-sectional structure of the first floor panel S1. On FIG. 3A, the rigidity adjusting area 66 to be described later is omitted and not shown. In addition, in FIG. 3A, the frame members 34 correspond to any of the No. 1 cross member 14, side sills 21, No. 2 cross member 26 or floor side frames 22 which surround the first floor panel S1. The first floor panel S1 has one end connected to the side surface of frame member 34 and also has a horizontal area 36 extending in the horizontal direction on the inside, a vertical area 38 extending vertically upward from the inside edge of the horizontal area 36 and panel area 40 extending inward from the upper edge of the vertical area 38. Moreover, the horizontal area 36 and vertical area 38 form the groove 33.

The groove 33 extends in the same shape around all four edges of the first floor panel S1, and the four outside edges of the horizontal area 36 are welded to No. 1 cross member 14 on the front edge of first floor panel S1, to side sill 21 on the vehicle body outside edge, to No. 2 cross member 26 on the rear edge and to floor side frame 22 on the vehicle body inside edge, respectively. In addition, while not shown on FIG. 1 and FIG. 2, damping material 42 is applied all around the groove 33.

In the embodiment, within the first floor panel S1, the groove 33 and damping material 42 block vibrations transmitted from the frame members 34 to the panel area 40, namely, they reduce the amount of vibration transmitted.

The frame members 34 undergo vibrations in various directions including the vehicle body up/down direction, horizontal directions (vehicle crosswise direction or vehicle body lengthwise direction) and rotation around axes of the frame members, so the horizontal area 36 and vertical area 38 which receive the vibration vibrate in a complex manner in these directions. In response to these complex vibrations, due to its shape, the groove 33 readily undergoes bending vibration with respect to vibrations in the vehicle body up/down direction, while the vertical area 38 readily undergoes bending vibration with respect to vibrations in the horizontal directions (vehicle crosswise direction or vehicle body lengthwise direction).

To explain in comparison to a conventional floor panel, with a conventional floor panel that is flat over its entire surface, vibration of the frame members in the vehicle body up/down direction is transmitted directly to the floor panel so bending vibration readily occurs in the floor panel. On the other hand, with the embodiment, vibration in the frame members 34 first causes the horizontal area 36 of the groove 33 to vibrate and the vibration is transmitted via the vertical area 38 to the panel area 40. Here, the horizontal area 36 and vertical area 38 get alternately closer to and further away from each other with the boundary point between them as the border and are thus deformed so that they bend. For the reason, the vibration of the frame members 34 gives rise to changes in the angles between the horizontal area 36 and vertical area 38, and between the vertical area 38 and panel area 40.

In this manner, the groove 33 essentially has a larger number of degrees of freedom of vibration than the panel area 40 extending in the horizontal direction, and in particular, it vibrates more readily in the left and right directions than the panel area 40. This is because, with respect to vibrations transmitted from the frame members 34, the rigidity of the groove 33 is lower than the rigidity of the panel area 40. In addition, in the groove 33, one can say that the rigidity varies discontinuously with the boundary point between the vertical area 38 and panel area 40 as the border.

Figure 3B:
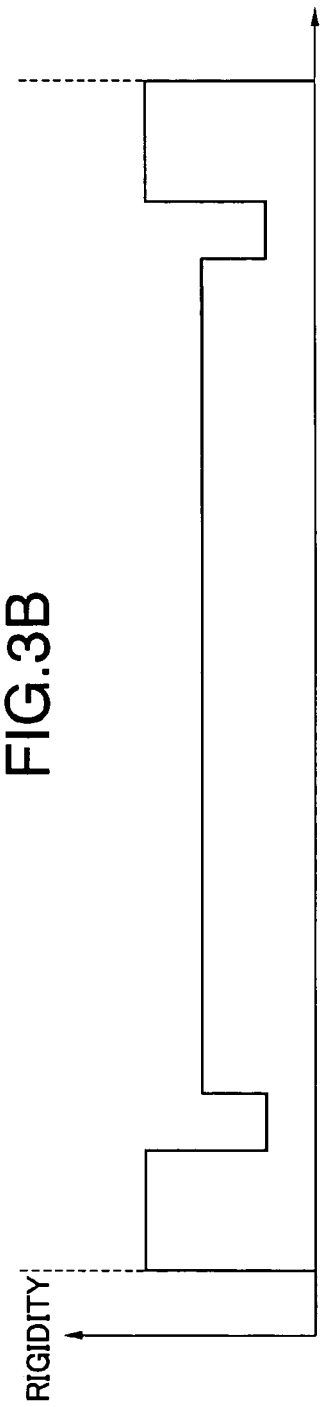

Note that FIG. 3B qualitatively presents the difference in rigidity of the various areas of such a floor panel. In this manner, the greater the difference in rigidity between the groove 33 and panel area 40, the more easily the groove 33 vibrates in comparison to the panel area 40, and moreover, an even greater damping effect is exhibited by providing damping material 42 in the groove 33.

Figure 3C:
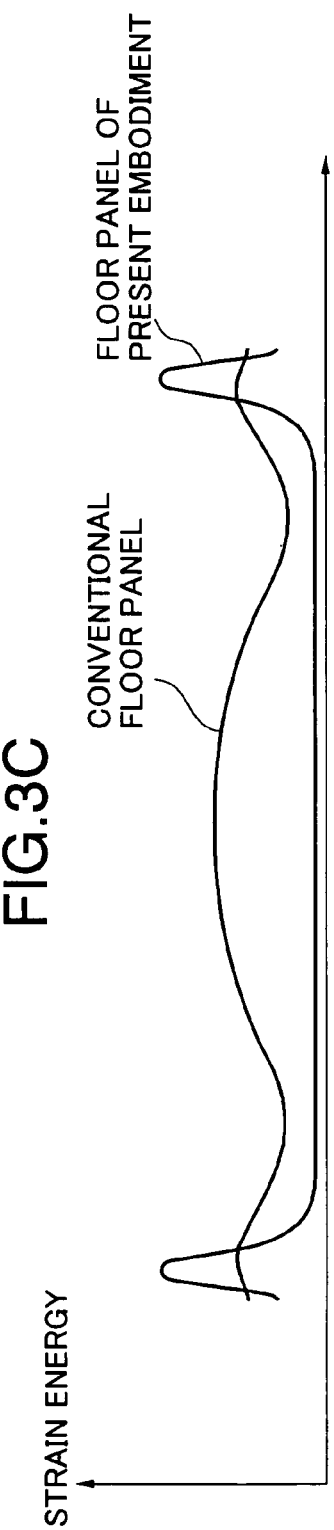

Next, FIG. 3C presents the distribution of strain energy occurring in the floor panel according to the embodiment, together with the strain energy distribution of the conventional floor panel. FIG. 3C illustrates the results of performing analysis by replacing experimental models of the floor panel according to the embodiment and the conventional floor panel shown in FIG. 8 (to be described later) with FEM analysis models.

As shown in FIG. 3C, the strain energy is distributed over the entire surface of the panel in a conventional floor panel, but in the floor panel according to the embodiment, the strain energy in the portion corresponding to the panel area 40 becomes extremely small. As a result, the result of the vibration reducing structure of the embodiment was confirmed by analysis.

In addition, one can see that the strain energy, namely the vibration energy, is concentrated in the groove 33 in the floor panel according the embodiment. As a result, it was confirmed that a large vibration damping effect is obtained by providing damping material in the groove 33.

The reason why vibration energy is concentrated in the groove 33 in this manner is because the groove 33 vibrates more readily than the panel area 40, and on the other hand, if vibration energy is concentrated in the groove 33 in this manner, the vibration transmitted from the frame members 34 to the panel area 40 can be reduced or blocked.

Figure 4:
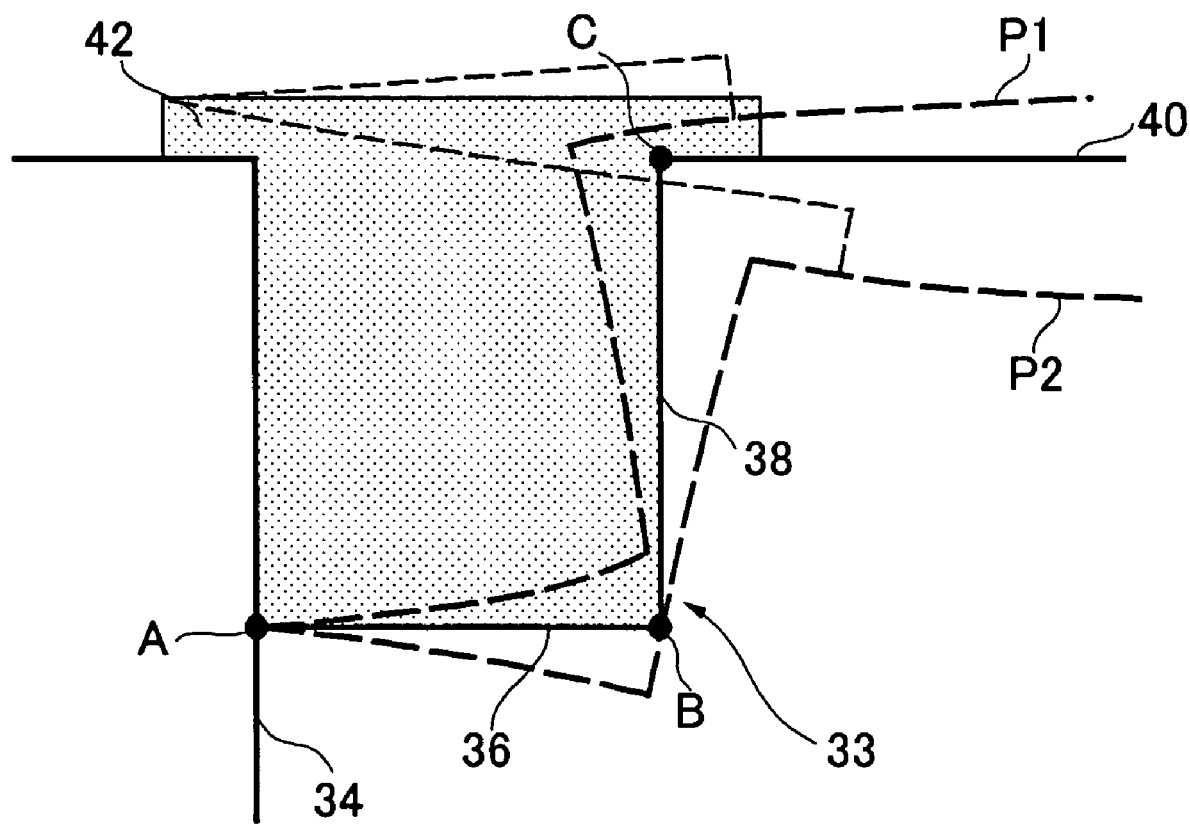
FIG. 4 is an enlarged view showing the groove and damping material in the vibration transmission-reducing structure according to the first embodiment.

Next, FIG. 4 is a partially enlarged view showing the groove 33 and damping material 42 of FIG. 2, so an example of deformation of the damping material 42 disposed in the groove 33 will be described with reference to FIG. 4. In FIG. 4, the solid line illustrates the state of the groove 33, panel area 40 and damping material 42 at rest, while the dashed lines illustrate them under deformation. In this example, deformation occurs so that the horizontal area 36 bends with the mounting point A on frame member 34 as the fixed end, while the vertical area 38 and panel area 40 also undergo bending deformation. Under such deformation, the damping material 42 is greatly deformed due to the relative displacement among the frame member 34, horizontal area 36 and vertical area 38, respectively, thus undergoing compressive/expansive deformation and shear deformation. For example, relative displacement between the frame member 34 and vertical area 38 may cause the damping material 42 to be compressed (to the state of dashed line P1) or expanded (to the state of dashed line P2), and moreover, it undergoes shear deformation between the frame member 34, horizontal area 36 and vertical area 38. In this manner, in comparison to the conventional floor panel structure wherein sheet-like damping material attached to the panel is distorted only by compression due to bending vibration of the panel, the damping material 42 is distorted even more greatly and its distortion state is complex, so its damping effect and attenuation effect become extremely large.

In this manner, when damping material 42 is disposed in the groove 33 (including the case in which damping material is disposed in the groove and in its vicinity), as described in FIG. 3C above, vibration energy is concentrated in the groove 33 so the vibration damping effect of the damping material is exhibited strongly. Accordingly, vibration transmitted from the frame members 34 to the panel area 40 can be effectively damped.

With the floor panel of the embodiment, the amount of vibration in the panel area can be reduced to the same level as in the conventional floor panel structure with a smaller amount of damping material than that conventionally used when damping material is applied to the entire surface of the panel, or a damping effect greater than the conventional can be obtained with the same amount of damping material.

As a result, according to the vibration reducing structure of the embodiment, a high damping effect is achieved by the groove 33 and the damping material 42 disposed in the groove 33 which is the low-rigidity area, and the vibration transmitted to the panel area 40 can be reduced. In addition, the same level of vibration damping effect as in the conventional structure can be obtained with a smaller amount of damping material as that used conventionally, so it is possible to achieve lighter vehicle bodies and reduced costs. Conversely, it is possible to obtain a greater vibration damping effect with the same amount of damping material.

Figure 5:
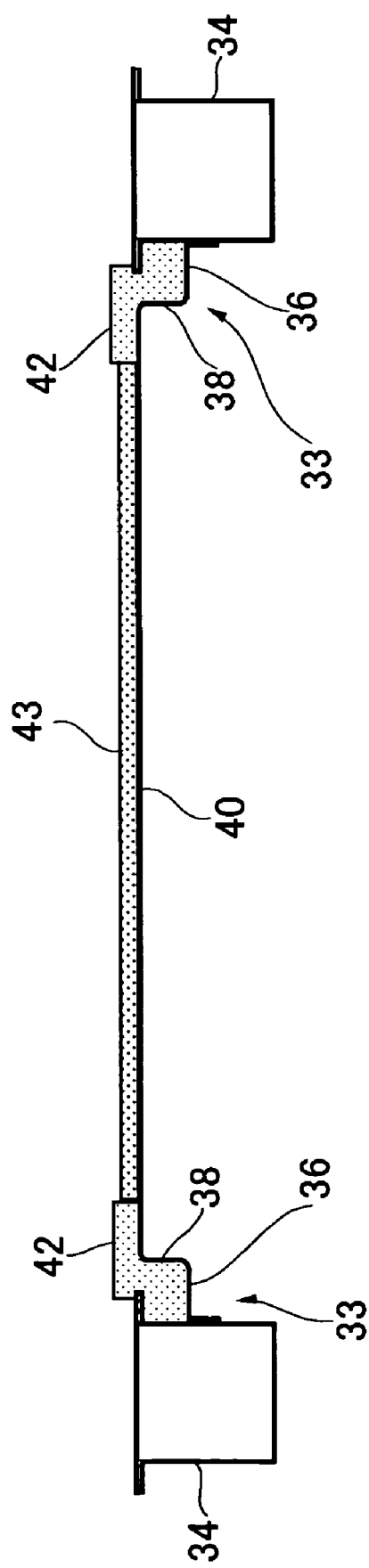
FIG. 5 is a schematic sectional view of a floor panel in which additional damping material is added to the floor panel of FIG. 3.

In addition to the engine or suspension vibration transmitted via the frame members 34, there are cases in which the so-called acoustic emission by sound transmission, where the floor panel is directly vibrated, becomes a problem. In order to prevent the acoustic emission, as shown in FIG. 5, it is effective for damping material 42 with high damping performance or damping power to be disposed in the groove 33 while damping material 43 which has lower damping performance or is thinner is applied to other portions of the floor panel (panel area 40, etc.) in order to prevent noise due to sound transmission. Alternately, sound-absorbing material that prevents noise due to sound transmission can be applied as damping material. In other words, while damping material is concentrated in the groove for the purpose of blocking vibration transmitted from the frame members, there is no need to install damping material upon the panel area for the purpose of preventing noise arising from vibration propagated from the frame, but on the other hand, installing damping material mainly for the purpose of preventing sound transmission is extremely effective in reducing vibration and noise within the cabin.

Here follows a further description of the floor panel of the second floor panel S2 with reference to FIG. 2 and FIG. 3. As shown in FIG. 2, the second floor panel S2 is provided within the space formed within No. 1 cross member 14, floor side frames 22 and No. 2 cross member 26, and the second floor panel S2 is joined by welding to these frame members with a vibration blocking area formed over the entire length of the joints with these frame members. More specifically, the grooves 33 forming the vibration blocking area along three sides which are the joints with the frame members of floor panel S2 are each formed linearly so as to enclose three sides of floor panel S2. Moreover, on the groove 33, the damping material 42 described above (not shown) is applied over the entire length of the groove 33.

Moreover, as shown in FIG. 2, in the portion of the second floor panel S2 abutting the floor tunnel 20 which is the forward portion on the inside edge, a plurality of beads 44 is provided with front/back clearance and extending in the vehicle crosswise direction so as to straddle the side surface of the floor tunnel 20 and the second floor panel S2. The positions of the vehicle body outward sides of these beads 44 are aligned so as to line up along a line 46 indicated by the two-dot chain line in FIG. 2. These beads 44 are intended to define the 2×1 regions in the vibration mode adjustment structure to be described later.

Here, it is preferable that no vibration blocking area and particularly no groove is provided in portions of the second floor panel S2 abutting the floor tunnel 20. This is because there are no frame members present in the floor tunnel 20, so it is not connected directly to the engine or suspension and thus little vibration is transmitted from the engine or suspension to the second floor panel S2, and also, if a vibration blocking area is provided, problems with the formability of the front floor panel 2 occur as described below.

Here follows a description of the formability of the front floor panel 2. When the second floor panel S2 is press-formed from a single sheet of metal including the floor tunnel 20, the floor tunnel 20 is fundamentally formed as a ridge, so material flows in the vehicle crosswise direction during forming. Accordingly, if a vibration blocking structure or particularly a groove extending in the vehicle body lengthwise direction is provided, the vibration blocking structure would interfere with the plastic flow of material during press forming, resulting in the problem of forming defects easily occurring. Accordingly, by providing no vibration blocking area and particularly no groove on the vehicle body inside edge of the second floor panel S2, it is possible to avoid interfering with the formability of the front floor panel 2.

However, it is also possible to install a vibration blocking area also in the portion corresponding to floor tunnel 20, thus reducing vibration transmitted from the floor tunnel 20 to the second floor panel S2, and further reducing noise due to acoustic emission from the second floor panel S2. However, in this case, in order to avoid hindering deformation of the steel plate or the expansion or contraction of the steel plate while the floor tunnel is formed by press-forming, it is preferable for the vibration blocking area to be provided as a member separate from the floor tunnel area, and be installed by such means as joining to the floor tunnel.

On the other hand, on the panel area 40 of the second floor panel S2 are provided rigidity adjusting areas 66 to be described later. The regions between these rigidity adjusting areas 66 and the lines 46 defined by one end of the aforementioned beads 44 extending in the vehicle crosswise direction, or namely the regions 47 including those portions of the panel area 40 enclosed by the two-dot chain line 46 and the one-dot chain line 50 have a lower rigidity than that of the rigidity adjusting area 66, so a rigidity difference occurs between the two, thus effectively forming a vibration blocking area. In this case, damping material may also be disposed in the region 47 forming one part of the panel area 40.

In this manner, if a vibration blocking area is effectively formed by the rigidity adjusting area 66 and the beads 44 extending in the vehicle crosswise direction, then the vibration blocking area can be installed without interfering with the press-formability of the floor tunnel 20.

Note that the regions between the rigidity adjusting areas 66 and the aforementioned lines 46, or namely the regions enclosed by the two-dot chain line 46 and the one-dot chain line 50 may be provided as thin-walled areas (low-rigidity areas) 48 that have a sheet thickness less than that of the panel area 40 and a lower rigidity, creating a rigidity difference between the panel area 40 and the thin-walled areas 48, and by disposing damping material (not shown) on the thin-walled areas 48 which are low-rigidity areas, it is possible to reduce or block vibrations transmitted from the floor tunnel 20 to the panel area 40. In this case, the beads 44 define the regions of the thin-walled areas 48 which serve as the vibration reducing structure or vibration blocking areas.

By forming thin-walled areas 48 in this manner, vibration blocking areas can be formed without interfering with press-formability.

Here follows a further description of the floor panel of the third floor panel S3 with reference to FIG. 2 and FIG. 3. As shown in FIG. 2, the third floor panel S3 is provided within the space formed within No. 2 cross member 26, floor side frames 22 and No. 3 cross member 28, and the third floor panel S3 is joined by welding to these frame members with a vibration blocking area formed over the entire length of the joints with these frame members. More specifically, the grooves 33 forming the vibration blocking area along three sides which are the joints with the frame members of the third floor panel S3 are each formed linearly so as to enclose three sides of floor panel S3. Moreover, on the groove 33, the damping material 42 described above (not shown) is applied over the entire length of the groove 33.

Moreover, with the third floor panel S3 also, in the same manner as in the aforementioned second floor panel S2, in the portion of the floor panel S3 abutting the floor tunnel 20 which is the forward portion on the inside edge, a plurality of beads 44 intended to define the 2×1 regions in the vibration mode adjustment structure to be described later is provided, and moreover it is preferable that no vibration blocking area is provided in portions abutting the floor tunnel 20. The reasons for this are the same as in the aforementioned description of the second floor panel S2.

In addition, with the third floor panel S3 also, in the same manner as the aforementioned second floor panel S2, on the panel area 40 are provided rigidity adjusting areas 66 to be described later, and the regions 47 including those portions of the panel area 40 enclosed by the two-dot chain line 46 and the one-dot chain line 50 effectively form a vibration blocking area, and damping material may also be disposed in the region 47.

Note that the regions enclosed by the two-dot chain line 46 and the one-dot chain line 50 may be provided as thin-walled areas (low-rigidity areas) 48 that have a sheet thickness less than that of the panel area 40 and a lower rigidity, and by disposing damping material (not shown) on these thin-walled areas 48, it is possible to reduce or block vibrations transmitted from the floor tunnel 20 to the panel area 40.

Here follows an operation of the floor panel structure according to the first embodiment of the present invention.

As described in FIG. 2, in the first floor panel S1, joints are formed around all edges of the floor panel S1, and the groove 33 is formed continuously along the entire length of these joints, so vibration from the frame members 34 (14, 21, 22, 26) are always transmitted via the groove 33 to the panel area 40, and thus vibration transmitted from the frame members 34 to the panel area 40 is reliably reduced or blocked so vibration of the panel area 40 can be reliably suppressed.

Moreover, in the first floor panel S1, the rigidity of the groove 33 is such that its rigidity is substantially constant along the entire length of the joints with the frame members 34. By doing so, it is possible to homogenize the vibration of the low-rigidity area (vibration blocking area) arising due to the transmitted vibration, and thereby the effect of blocking vibration to the panel area can be increased further, so vibration can be damped effectively.

In other words, vibration transmitted from the frame is decreased or blocked in the low-rigidity areas or vibration blocking areas, so vibration in the panel area of the floor panel can be suppressed, but the vibration energy is concentrated in these low-rigidity areas which are greatly deformed. In this state, if the rigidity becomes heterogeneous along the entire periphery of these low-rigidity areas, then different vibration modes arise in these heterogeneous portions and vibration energy is not as easily concentrated, so vibration becomes easily transmitted from those portions to panel areas. In addition, if there is a place with an even partially slightly higher rigidity, then the rigidity of the entire low-rigidity area increases and the vibration blocking effect is reduced. Accordingly, making the vibrations of the low-rigidity area homogeneous can further increase the effect of blocking vibrations to the panel area and effectively decrease vibrations.

Note that when the vibration mode is homogeneous along the entire periphery of the low-rigidity areas, it is easier to establish the shape and size of the low-rigidity areas when actually providing a floor panel according to the embodiment in various vehicle models.

Regarding the second floor panel S2 and third floor panel S3, in the same manner, the groove 33 is provided along the entire length of the joints with the frame members 34 (22, 14, 26) for second floor panel S2 and with the frame members 34 (22, 26, 28) for third floor panel S3, respectively, so the vibration transmitted from the frame members 34 which are the main source of transmission of vibration is always transmitted to the panel area 40 via the groove 33, and thus the vibration of the panel area 40 can be reliably suppressed.

In addition, as shown in FIG. 2, grooves 33 are disposed linearly along the frame members 34 in the first floor panel S1, thus forming a substantially square shape. In addition, in the second floor panel S2 and third floor panel S3 also, the grooves are disposed linearly along the various frame members 34, thus forming a substantially square C-shape. By forming the groove 33 linearly in this manner, the groove 33 vibrates more easily. More specifically, deformation of the groove 33 as illustrated by dashed lines P1 and P2 in FIG. 4 occurs more easily when the point A of mounting the horizontal area 36 to the frame members 34, the boundary point B between the horizontal area 36 and the vertical area 38 and the boundary point C between the vertical area 38 and panel area 40 are linear than when curved. In addition, in the same manner as in the case described above where the rigidity of the low-rigidity area is made homogeneous, it is possible to increase the effect of blocking vibration to the panel area and vibration can be effectively damped.

In addition, as shown in FIG. 3, the groove 33 is welded directly to each of the frame members 34, so no flat panel portions, for example, that emit large amounts of noise are present between the frame members 34 which are the source of transmission of vibration and the grooves 33 which block vibration, so no noise due to acoustic emission caused by the presence of these flat panel portions occurs. In the second floor panel S2 and third floor panel S3 also, the groove 33 is welded directly to each of the frame members 14, 21, 22, 26 and 28 so similarly no flat panel portions, for example, that emit large amounts of noise are present between the frame members which are the source of transmission of vibration and the grooves 33 which block vibration, so no noise due to acoustic emission from these flat panel portions occurs.

The structure of the corners of the grooves 33 formed on the first through third floor panels S1, S2 and S3 will be now described with reference to FIG. 6 and FIG. 7.

Figure 6:
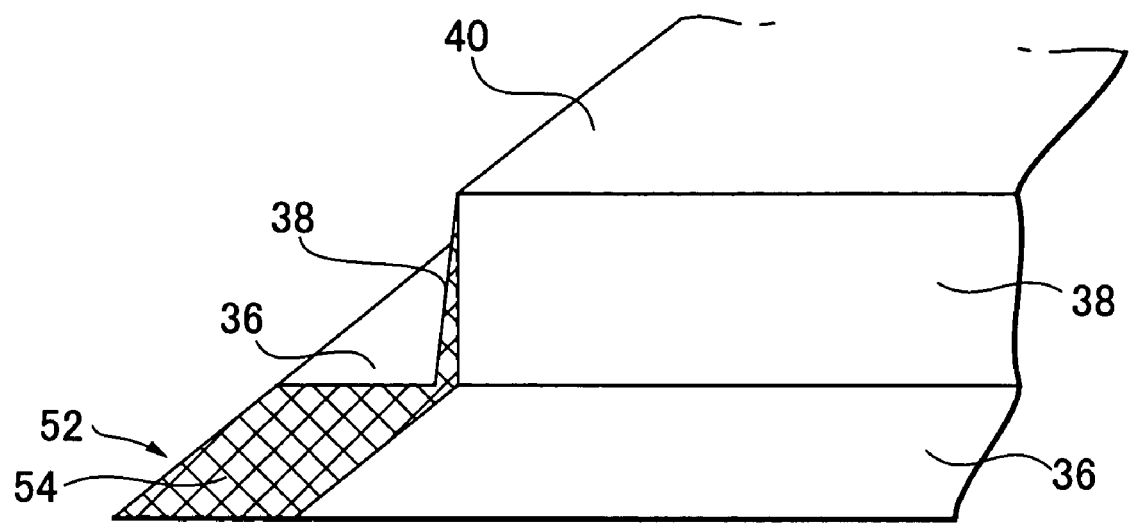
FIG. 6 is an enlarged view showing one example of the corner of the groove according to the first embodiment.

FIG. 6 is an enlarged view illustrating one example of the corner of groove 33. The frame members 34 and damping material 42 are omitted and not shown. The two horizontal areas 36 and two vertical areas 38 are not fixed to each other at the corner 52 of the groove 33, but rather they are connected to each other with elastic sealant 54 disposed in between. In this manner, the horizontal areas 36 and vertical areas 38 are not fixed to each other, but rather these horizontal areas 36 and/or the vertical areas 38 of the groove 33 are connected such that movement in mutually adjacent portions is permitted. As a result, it is possible to prevent the rigidity of the groove 33 from increasing and to suppress mutual vibration among the vertical areas and horizontal areas in the groove, and so the damping effect described above can be exhibited effectively. In addition, it is also possible for either the horizontal areas 36 or the vertical areas 38 to be not fixed to each other.

Here, the sealant 54 may be replaced with viscous (flexible) adhesive, damping material or the like.

Figure 7:
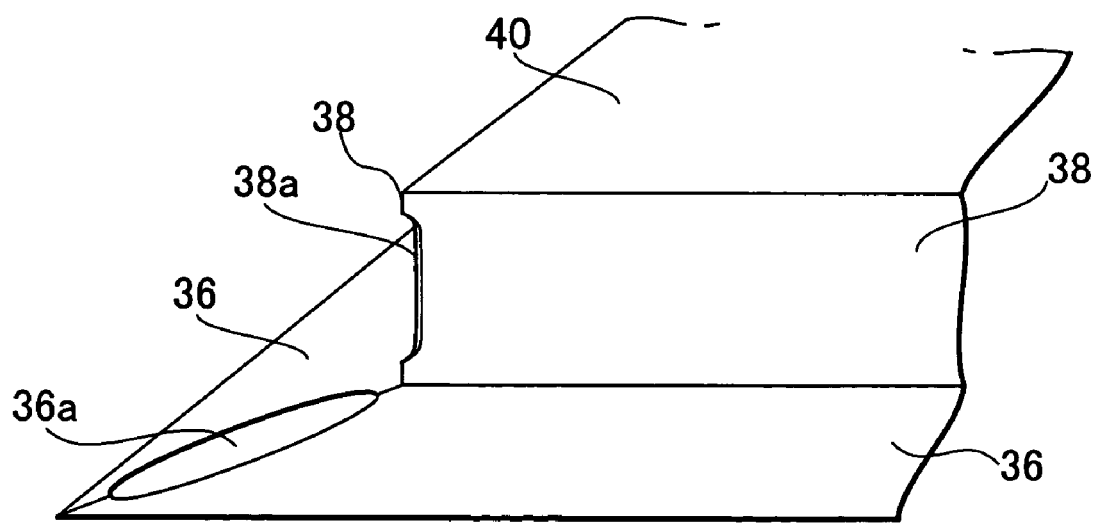
FIG. 7 is an enlarged view showing another example of the corner of the groove according to the first embodiment.

Moreover, as shown in FIG. 7, it is also possible to fix the horizontal areas 36 and vertical areas 38 to each other, but also form gaps 36a and 38a in the various fixed portions, thereby connecting these horizontal areas 36 and/or vertical areas 38 of the groove 33 such that vibrations in mutually adjacent portions are suppressed, thereby preventing the rigidity of the groove 33 from increasing.

In addition, when one side of the groove 33 is long, even if the sides of the groove 33 are fixed to each other at the corners, this will have little effect on suppressing mutual vibration among the sides of the groove, so the horizontal areas 36 and/or vertical areas 38 may be fixed to each other by welding or other methods.

Figure 8A:
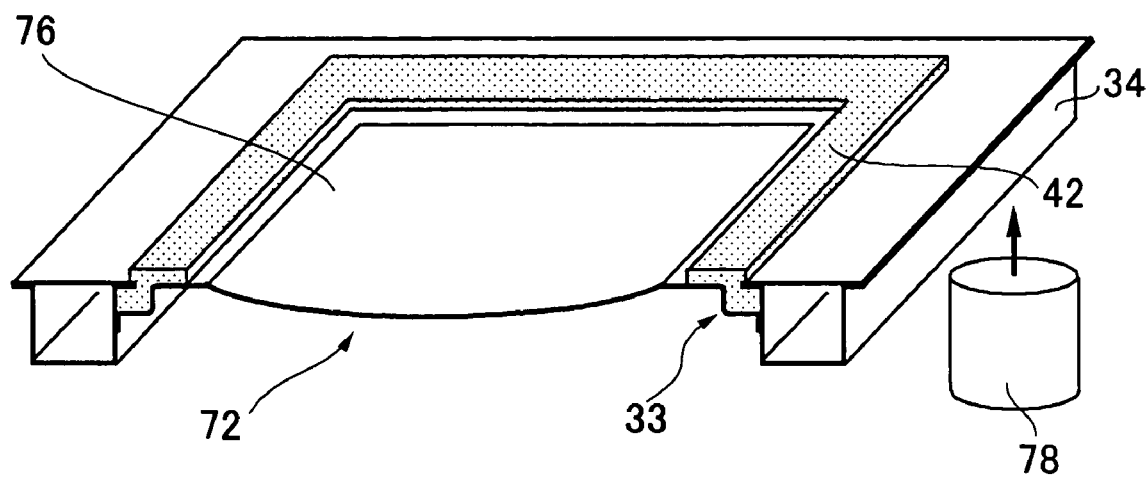
FIGS. 8A and 8B are perspective sectional views of experimental models used to describe the vibration blocking characteristics of the vibration reducing structure according to the first embodiment.
Figure 8B:
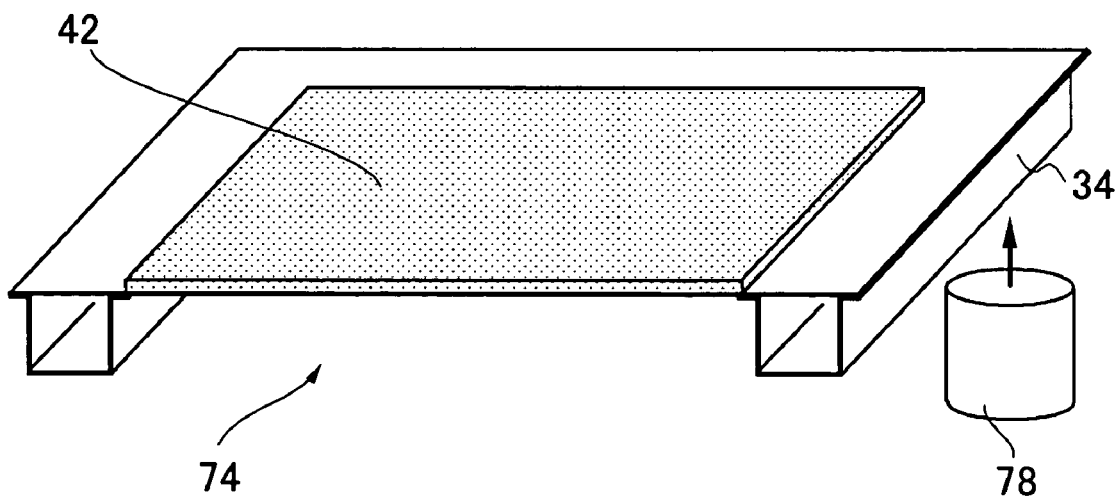

The vibration blocking characteristics of the vibration reducing structure (vibration blocking area) according to the embodiment will be described with reference to FIGS. 8–10, using the case in which the low-rigidity area is a groove as an example. FIG. 8A illustrates an experimental model of a floor panel according to the embodiment, while FIG. 8B is an experimental model of a conventional floor panel. These experimental models include experimental frame members 34 with a rectangular cross section disposed in the shape of a square when seen from above, provided with a panel 72 having the vibration reducing structure according to the embodiment (see FIG. 8A) or a conventional panel 74 (see FIG. 8B), respectively. As shown in FIG. 8A, the panel 72 according to the embodiment has a groove 33 which is the vibration reducing structure, with damping material 42 attached to the groove 33 and an indentation 76 provided in the center of the panel surface in order to increase the rigidity. Note that the indentation 76 is equivalent to the curved surface 82 of the floor panel shown in FIG. 14E to be described later. As shown in FIG. 8B, the conventional panel 74 has damping material 42 attached to the entire surface of the panel which is flat over its entire surface. In the experiment, a shaker 78 applies a shaking force F with a predetermined range of frequencies (white noise) to an area of the frame member 34 to which the floor panel is attached, and the state of vibration α and the acoustic emission power P of the panel surface are measured.

Figure 9A:
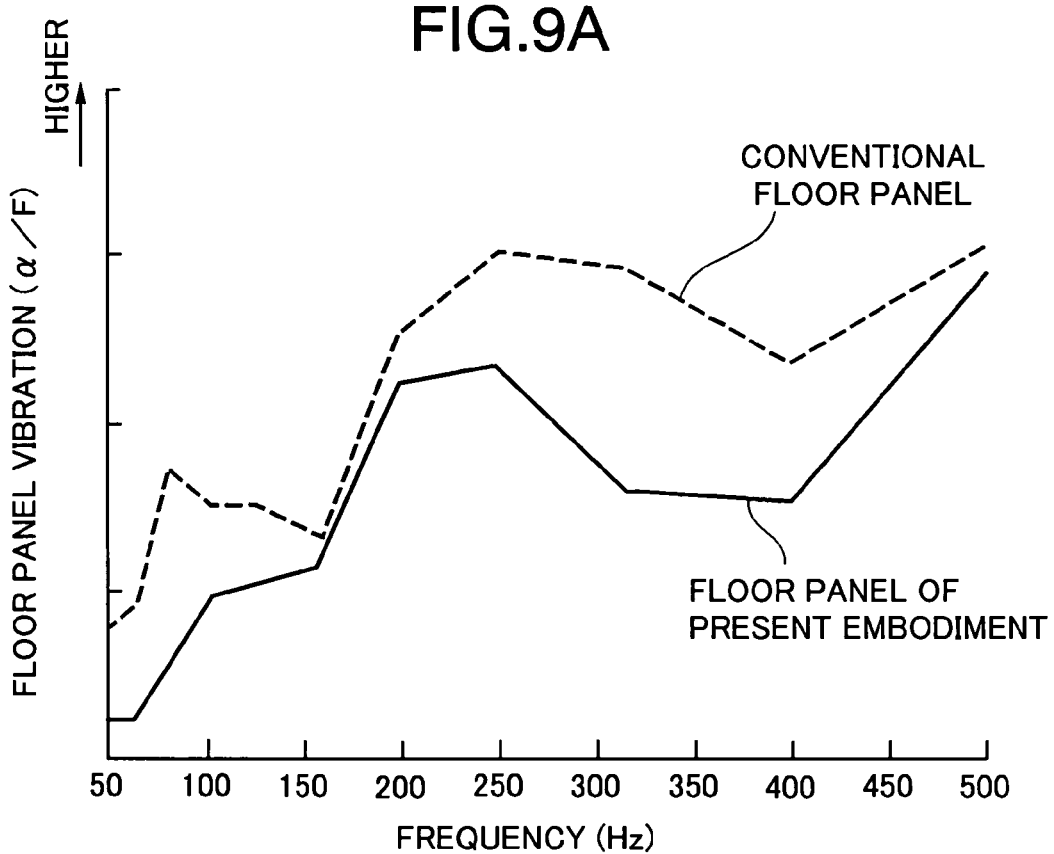
FIGS. 9A and 9B are plots of the experimental results obtained from the experimental models of FIG. 8.
Figure 9B:
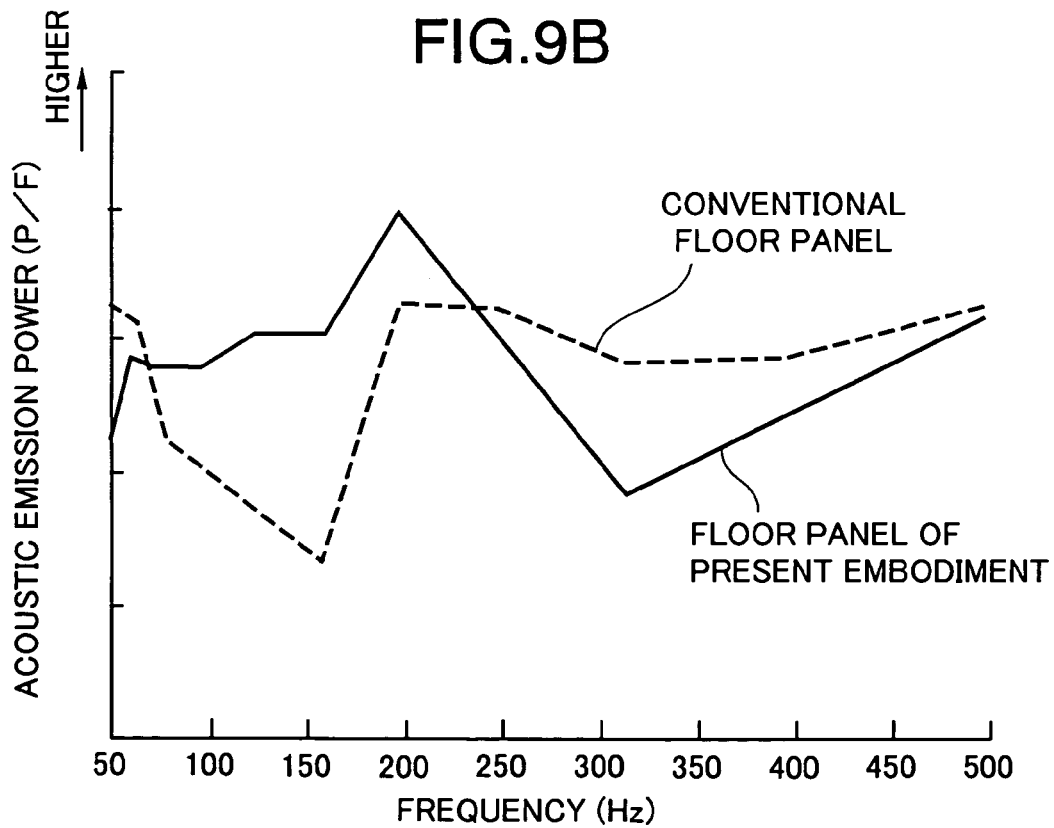

FIG. 9 illustrates the experimental results obtained from the aforementioned experimental models. As shown in FIG. 9A, with the panel 72 according to the embodiment, the vibration of the panel (α/F) decreased over the entire frequency range. As a result, the effect of the vibration reducing structure according to the embodiment was confirmed. Moreover, as shown in FIG. 9B, with the panel 72 according to the embodiment, the vibration of the panel (α/F) decreased over the entire frequency range. As a result, the meritorious effects of the vibration reducing structure of the embodiment were confirmed over a wide range of fixed frequency domains. Note that the frequency domains in which the acoustic emission power decreases vary depending on the shape of the groove, size and structure of the floor panel and other parameters, but the vibration reducing structure of the embodiment was able to reduce acoustic emission over a wide frequency domain stretching from above roughly 200 Hz to roughly 300 Hz.

Figure 10:
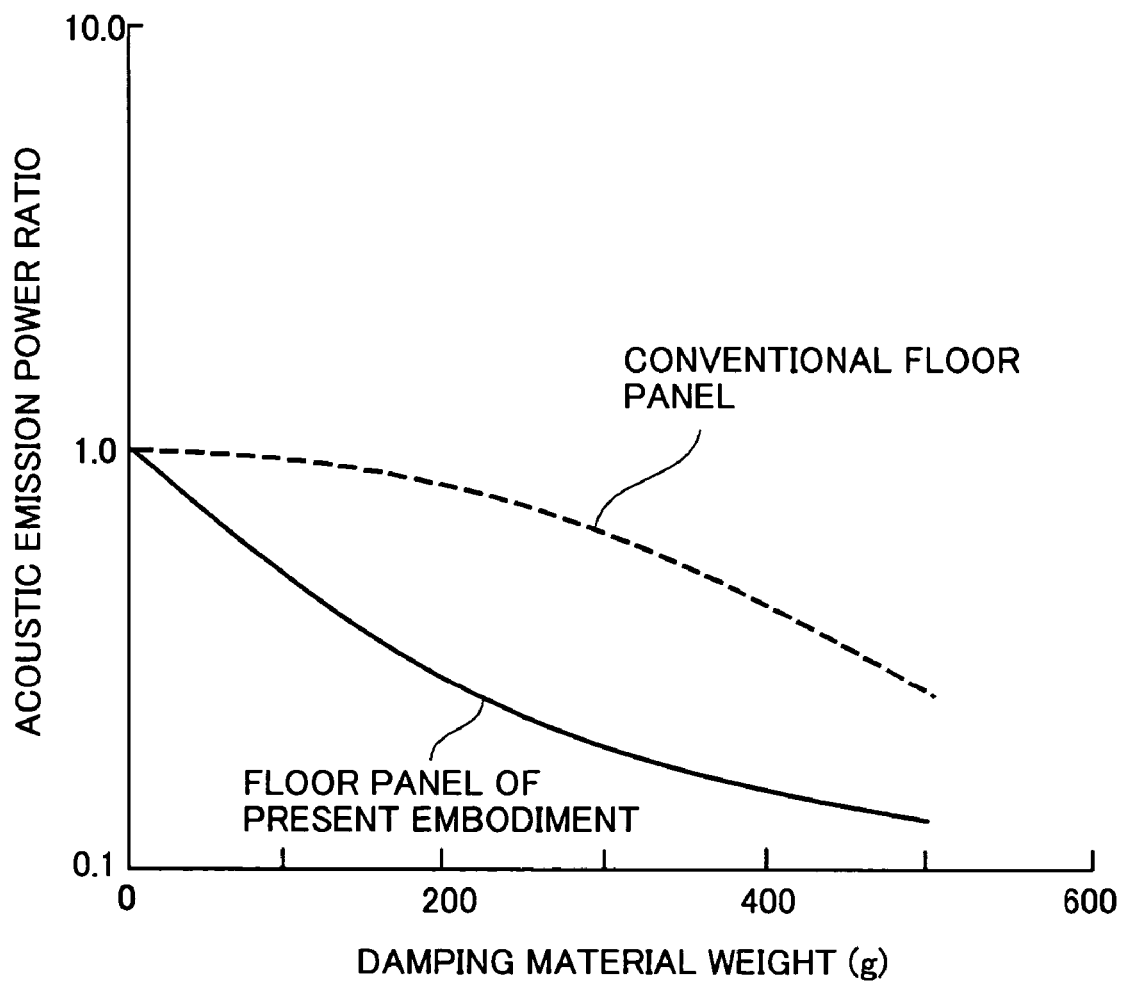
FIG. 10 is a plot of the experimental results obtained from the experimental models of FIG. 8.

Next, FIG. 10 illustrates the experimental results in the case of varying the quantity or weight of damping material in the aforementioned experimental model. As shown in FIG. 10, the acoustic emission power ratio of the panel 72 according to the embodiment is less than that of the conventional panel with damping material disposed over the entire surface of the flat panel. More specifically, when the same weight of damping material is disposed on the groove 33 of the embodiment and over the entire surface of the conventional flat panel, the acoustic emission power is much less in the panel according to the embodiment. In other words, the acoustic emission power can be reduced with a smaller amount of damping material than in the case of disposing damping material over the entire surface of a conventional flat panel. In this manner, with a panel provided with a vibration reducing structure, it is possible to reduce the amount of damping material used and reduce the weight of the vehicle.

As described above, the floor panel structure of a vehicle body according to the embodiment greatly reduces noise due to vibration at frequencies above 200 Hz by providing a vibration reducing structure.

On the other hand, the peak in road noise due to tire cavity resonance typically appears in a frequency band in the range of 200 to 300 Hz, but the peak in road noise due to suspension resonance appears in a band at 200 Hz and below, so road noise becomes a problem in each band.

For this reason, the floor panel structure of a vehicle body according to the embodiment is also intended to reduce acoustic emission due to vibration in the frequency band of 200 Hz due to suspension resonance by providing a further vibration mode adjusting structure (vibration mode adjusting area) in addition to the aforementioned vibration reducing structure.

In the embodiment, frequencies in the vicinity of 160 Hz which is a problem in vehicles that have strut suspensions are the setting target for the reduction of acoustic emission. The frequency (setting target) of vibration occurring due to suspension resonance differs depending on the type of suspension, so the setting target becomes a different value in the case of a suspension of another type such as the double wishbone.

Figure 11:
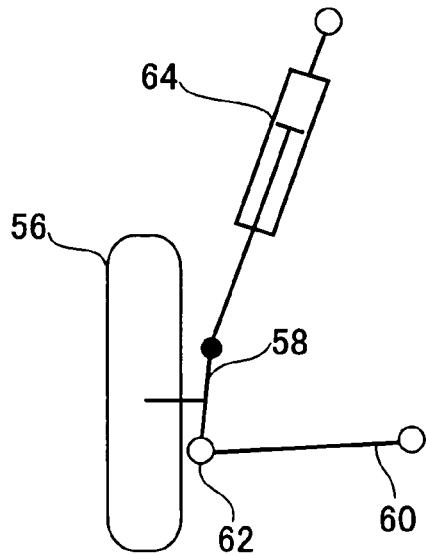
FIG. 11 is a schematic view showing a strut suspension system.

FIG. 11 is a schematic drawing illustrating a strut-type suspension. The bottom end of the knuckle/spindle 58 of the front wheel 56 is linked to a suspension arm 60 at a ball joint 62, and the bottom end of the shock absorber 64 is joined rigidly to the top end of the knuckle/spindle 58 (the joint is represented by a black circle). Note that the top end of the shock absorber 64 is coupled to the tire housing.

The vibration mode adjusting structure in the floor panel structure of a vehicle body according to the embodiment is constituted such that the floor panel vibrates at a specific frequency, for example, at a frequency near 160 Hz in the embodiment, in vibration modes that have low acoustic emission efficiencies. Here, vibration modes that have low acoustic emission efficiencies are described in detail in the aforementioned JP-A-9-202269 whose. Note that the content recited in JP-A-9-202269 is incorporated into the present specification as a reference. In short, taking n and m to be the number of antinodes of a standing wave generated in the lengthwise and crosswise directions, respectively, of a rectangular region, as illustrated in the examples shown in FIG. 12, if "n×m=even number" is true, then sound emissions from adjacent portions in opposite phases within the panel in question cancel each other, so the acoustic emission energy is greatly decreased.

Figure 12A:
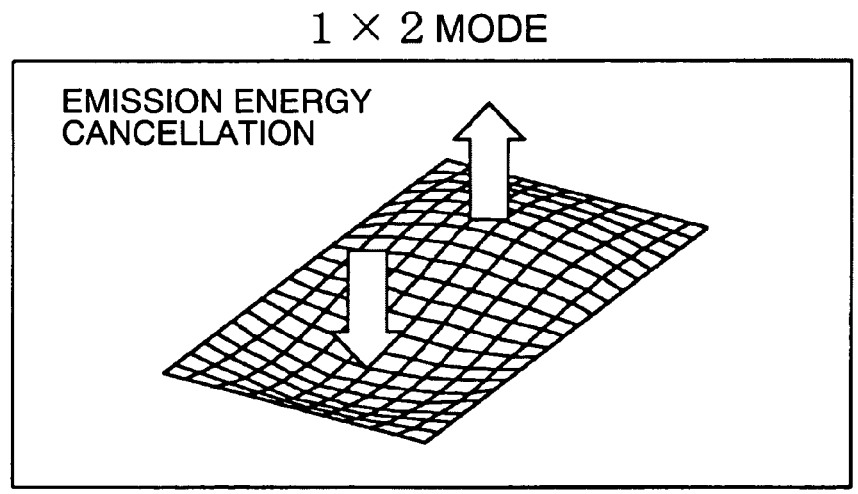
FIGS. 12A and 12B are schematic views showing the cancellation of sound emitted by the floor panel with a vibration mode adjusting structure according to the first embodiment.
Figure 12B:
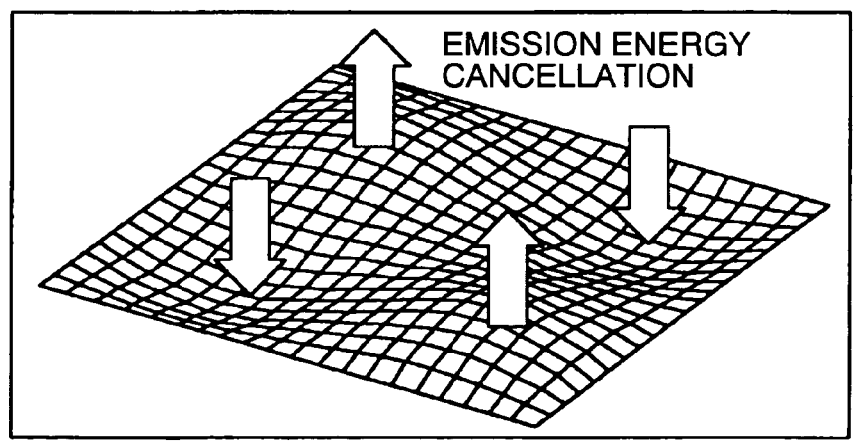

More specifically, in the "2×1=2" vibration mode illustrated in FIG. 12A, the two portions within the floor panel vibrate at the same amplitude and opposite phases, so the sound emissions cancel each other, and thus the acoustic emission efficiency becomes a minimum at this time.

In addition, in order to induce vibration in the 2×1 mode, the generally rectangular panel areas (vibration regions) 40 of the floor panels S1 through S3 should preferably form rectangular vibration regions where the ratio of the short side to the long side is roughly 1:2 in particular, so it is preferable to form a rectangular vibration region where the length of the short side is 200 mm and the length of the long side is 400 mm, for example.

In the embodiment, as shown in FIG. 2, the first floor panel S1 described above has a groove 33 formed around its entire periphery, and a panel area 40 is formed within. In the first floor panel S1, the panel area 40 enclosed by the groove 33 has the shape of a rectangle with substantially 2×1 proportions between its length in the vehicle lengthwise direction and its length in the vehicle crosswise direction.

The second floor panel S2 and third floor panel S3 differ from the first floor panel S1 in that the fringe width of the floor tunnel 20 on their vehicle body insides vary, so they have a non-rectangular shape with their width in front being wider than their width in back. Thus, the second floor panel S2 is formed such that the interval between the line 46, extending in the vehicle body lengthwise direction along vehicle body outward sides of the plurality of beads 44 and the fringes of the floor tunnel 20 behind these beads 44, and the facing groove 33, or namely the width of the panel area 40 (its dimension in the vehicle width direction) is roughly constant over the entire length in the vehicle body lengthwise direction. The third floor panel S3 also has a non-rectangular shape where its width in front is narrower than its width in back, so in the same manner as panel S2, the interval between line 46 and the facing groove 33, or namely the width of the panel area 40 (its dimension in the vehicle width direction) is roughly constant over the entire length in the vehicle body lengthwise direction.

As a result, in floor panels S2 and S3, the vibration blocking area formed by the groove 33 which surrounds the panel area 40 on three sides and the panel area 40 surrounded by line 46 have a length in the direction of vehicle travel and length in the vehicle crosswise direction that form a rectangle with lengths of substantially 2×1. In addition, when thin-walled areas (low-rigidity areas) 48 described above are provided, the interval between these thin-walled areas 48 may be made substantially constant over the entire length in the vehicle body lengthwise direction.

Accordingly, in floor panels S1-S3 according to the embodiment, the panel areas 40 are rectangular with lengths of 2×1, and as a result, vibration in the 2×1 mode occurs more readily. In addition, the groove 33 (thin-walled area 48) which is the vibration blocking area forms the vibration mode adjusting structure as a 2×1 region because of its structure.

Note that the groove 33 may be replaced by the thin-walled areas 48 described above or the planar areas 83 to be described later. In addition, the low-rigidity areas of the vibration blocking area may be formed by the beads to be described later, and the vibration blocking area and vibration mode adjusting structure may be formed as a unit by press-forming so that these beads define the region of the vibration mode adjusting structure, or namely the panel surface with a 2×1 rectangular shape.

Figure 13:
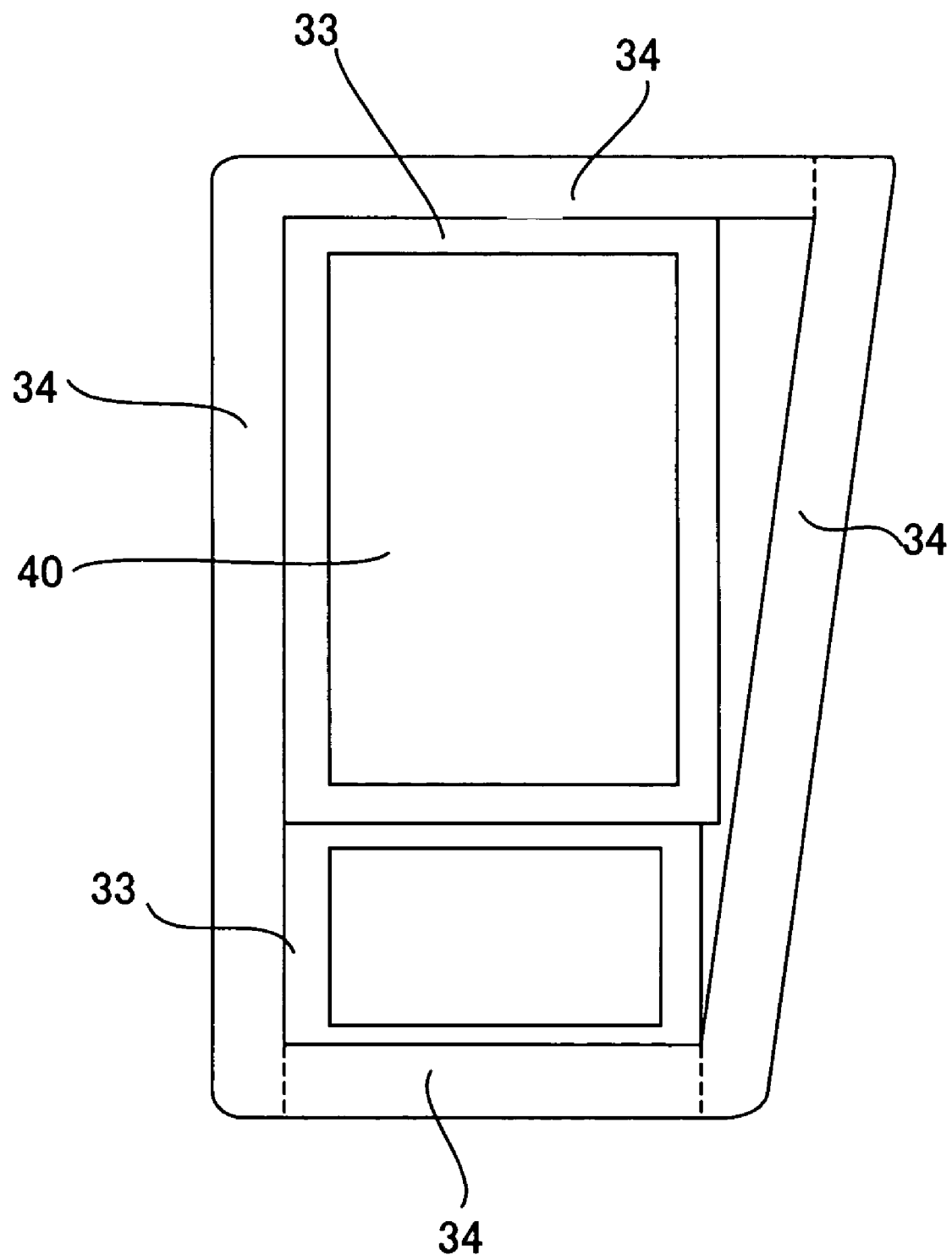
FIG. 13 is a top view showing another example of the vibration mode adjusting structure according to the first embodiment.

On the other hand, the frame members 34 (14, 21, 22, 26, 28) and floor tunnel 20 must serve their original functions, so there are cases in which their dimensions, shape or layout cannot be significantly changed. For this reason, in the event that it is difficult to give the panel surface a substantially 2×1 rectangular shape in order to induce vibrations in the "2×1 mode," as shown in FIG. 13, the vibration blocking area consisting of the groove 33 described above is formed as a nearly 2×1 rectangular shape as large as possible within the region enclosed by the frame members 34 (including the case in which one side is the floor tunnel 20) and a rectangular panel area (panel surface) 40 with dimensions of substantially 2×1 is formed therein. Moreover, in the embodiment, in order to prevent sounds from the remaining areas of the floor panel from being emitted at high volume, it is preferable for the remaining areas to be surrounded by a vibration blocking area consisting of a groove 33. In addition, it is possible to form the regions thus surrounded as rectangles with dimensions of substantially 2×1, thus generating vibrations in the 2×1 mode described above. Note that in this case also, the groove 33 may be replaced by the thin-walled areas 48 described above or the planar areas 83 to be described later, or the low-rigidity areas of the vibration blocking area may be formed from the beads to be described later.

In the embodiment, the vibration mode adjusting structure must cause vibrations in the 2×1 mode due to the panel area 40 to be generated at specific frequencies. For this reason, as shown in FIG. 2, in the floor panels S1 through S3, in order to adjust the panel area (panel surface) rigidity of each so that the 2×1 mode is generated at roughly 160 Hz, two substantially circular rigidity adjusting areas 66 are formed such that they are lined up in the vehicle body lengthwise direction. These rigidity adjusting areas 66 have substantially the same shape and are formed in the front and back parts of the panel area 40 as a substantially circular curved surface that is indented downwards (or protruding upward as a protruding curved surface).

Note that on each rigidity adjusting area 66 are formed substantially cross-shaped concavo-convex lines serving to both adjust rigidity and halt slippage. In addition, holes 68 for draining water are also provided on the first floor panel S1 and third floor panel S3, but they are disposed such that they do not have deleterious effects on the vibration modes of the respective panel areas 40.

In the embodiment, by appropriately modifying the shape of these rigidity adjusting areas 66, it is possible to reliably induce vibration in the 2×1 mode with respect to vibration input in the aforementioned stipulated frequency band, namely frequencies near 160 Hz, and thus it is possible to make the acoustic emission efficiency extremely low by inducing mutual cancellation of sound emitted from adjacent opposite-phase portions in each floor panel (cancellation of emitted sound).

As described above, according to the embodiment, in the floor panels S1 through S3, respectively, the vibration reducing structure (vibration blocking area) effectively blocks vibration with respect to vibration input in the stipulated frequency band (200 Hz or greater), and particularly with respect to vibration input at roughly 250 Hz, and also the vibration mode adjusting structure (vibration mode adjusting area) induces a 2×1 vibration mode with a low acoustic emission efficiency with respect to vibration input in the stipulated frequency band (200 Hz or less), and particularly with respect to vibration input at roughly 160 Hz.

Moreover, in the fourth floor panel S4, its rigidity is adjusted so that the natural frequency of floor panel S4 becomes 300 Hz or greater.

Accordingly, according to the floor panel structure of a vehicle body of the embodiment, the vibration reducing structure and vibration mode adjusting structure reduce vibration and reduce acoustic emission at frequencies near 160 Hz and at frequencies near 250 Hz which are set as the target frequencies for the problem of road noise.

In the aforementioned embodiment, vibration transmitted from the frame members to the panel area is reduced or blocked by providing damping material in the low-rigidity areas of the vibration reducing structure that utilizes the difference in rigidity between the low-rigidity areas and high-rigidity areas, but the present invention is not limited thereto, as it is able to reduce or block vibration even in the case that no damping material is provided. Here follows a description of the reasons therefor by comparison, where necessary, to the conventional floor panel structure of a vehicle body which is an overall flat floor panel.

Let us first describe the effects of the vibration modes in the case that the low-rigidity areas of the vibration reducing structure are grooves or beads as described later. Note that with both grooves and beads, the fundamental behavior of each is the same so here we shall describe grooves as an example.

With the conventional floor panel that is flat over its entire surface, vibrations of frame members in the vehicle body up/down direction are transmitted directly to the floor panel, so the floor panel is susceptible to bending vibration.

On the other hand, in the embodiment in which a groove is provided but no damping material is provided as the low-rigidity area of the vibration reducing structure of the present invention, the vibrations of frame members in the vehicle body up/down direction first shake the horizontal areas of the grooves and these vibrations are transmitted to the panel area via the vertical areas. Here, the horizontal areas and vertical areas get alternately closer to and further away from each other with the boundary point between them as the border and can thus be deformed so that they bend. In addition, the horizontal areas are susceptible to bending vibration with respect to vibration in the vehicle body up/down direction, while the vertical areas are susceptible to bending vibration with respect to vibration in the horizontal directions (vehicle crosswise direction and vehicle body lengthwise direction). For this reason, vibrations of frame members in the vehicle body up/down direction induce bending vibration in the horizontal areas, causing angular changes between the horizontal areas and vertical areas and between the vertical areas and the panel areas, but they do not directly induce bending vibration in the panel areas. So as a result, bending vibration of the panel areas is reduced. Note that this phenomenon also occurs due to vibrations that cause the frame members to rotate around their axes, and in this case also, vibrations can be similarly reduced.

In contrast, when the conventional floor panel that is flat over its entire surface is subjected to vibrations in the horizontal directions (vehicle crosswise direction and vehicle body lengthwise direction), bending vibration is induced in the vehicle body up/down direction.

On the other hand, the vertical areas of the groove extend in the vehicle body up/down direction and are thus are susceptible to bending vibration with respect to vibrations in the horizontal directions. For this reason, the vertical areas undergo bending vibration and absorb vibration in the horizontal directions from the frame members, so bending vibration is not readily induced in the panel areas. As a result, bending vibration due to vibration in the left-and-right direction from the frame members is not easily induced in the panel areas, so vibration is reduced or blocked by that much.

It will be now described that the effect of the weight of the panel areas at the time that the vibration blocking area blocks vibration. In a conventional floor panel, the frame members have a much higher rigidity than the floor panel, so floor panels connected to the frame members are easily vibrated upon receiving shaking forces directly from the frame members.

On the other hand, according to the embodiment, the panel areas are surrounded by low-rigidity areas that are readily vibrated and the panel areas have a larger surface area than the low-rigidity areas, so they tend to stay in their place due to the momentum from the weight of the panel itself. In other words, while the low-rigidity areas are shaken by the frame members and vibrate, the panel areas tend to stay in place, so the low-rigidity areas that have less rigidity than the panel areas act like springs and stop vibration, so the panel areas become more resistant to vibration than when attached directly to the frame members.

Furthermore, in describing the effect of the reflection of vibration, reflection of vibration within the floor panel does not normally occur in the conventional floor panels that are flat over their entire surface.

On the other hand, according to the embodiment, reflection of vibration occurs at the boundary point where the rigidity changes between the high-rigidity areas and low-rigidity areas, so vibration transmitted from the frame members to the panel areas is reduced (blocked) by the amount reflected.

Moreover, upon considering the effects of vibration energy, the rigidity is constant over the entire surface of a conventional floor panel that is flat over its entire surface, so vibration energy is distributed over the entire floor panel surface according to its vibration modes.

On the other hand, according to the embodiment, the low-rigidity areas are more susceptible to vibration than the high-rigidity areas, so vibration energy tends to be concentrated in these low-rigidity areas. Accordingly, vibration is reduced in the panel areas which are the high-rigidity areas by providing, in the periphery of the high-rigidity areas (panel areas) occupying the majority of the floor panel, low-rigidity areas where such vibration energy is easily concentrated.

Here follows a description of examples of modifications of the floor panel structure of a vehicle body according to the first embodiment of the present invention. These examples of modifications illustrate other examples of the vibration reducing structure described above. Here, in the embodiment described above illustrated in FIG. 2, a difference in rigidity is provided between the groove 33 which is the low-rigidity area, and the panel area 40 which is the high-rigidity area, and damping material 42 is disposed on the groove 33 which is the low-rigidity area, thus blocking the vibrations transmitted from the frame members 34 to the panel area 40, but in this example of modification also, its basic structure is the same.

Note that in FIG. 14, the frame members 34 correspond to one of the aforementioned No. 1 cross member 14, side sills 21, floor side frames 22, No. 2 cross member 26 or No. 3 cross member 28.

Figure 14A:
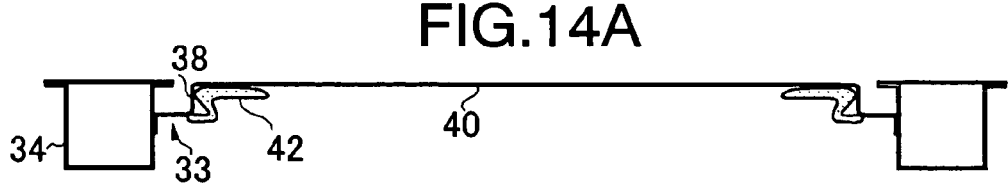
FIGS. 14A, 14B, 14G, 14D, 14E, 14F, and 14G are sectional views showing variations of the floor panel structure of a vehicle body according to the first embodiment.

The example of modification shown in FIG. 14A has a groove 33 and panel area 40, with damping material 42 disposed below the groove 33 and panel area 40. At the position of the damping material, the damping material 42 is greatly deformed due to the relative displacement of the vertical area 38 and panel area 40, so a large damping effect is obtained.

Figure 14B:
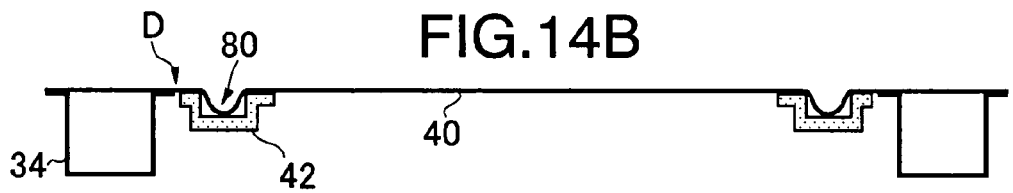

FIG. 14B illustrates an example in which a bead 80 which is a low-rigidity area is formed in the vicinity of the frame members 34 of the floor panel. The bead 80 is disposed linearly along the frame member 34 and has a curved cross section and thus readily vibrates in the vehicle body up/down direction and horizontal directions (vehicle body crosswise direction and vehicle body lengthwise direction), while bending readily occurs about the bead 80 as the boundary. In this manner, in the same manner as the groove 33 described above, the bead 80 essentially has a large number of degrees of freedom in vibration than the panel area 40, and the vibrations are generated in many variations, so it vibrates more readily than the panel area 40. The damping material 42 is attached so that it covers the bead 80 from below, so the bead 80 and damping material 42 effectively reduce or block the transmission of vibration from the frame members 34 to the panel area 40. Note that the damping material 42 may also be disposed on the inside of the bead 80.

Figure 17:
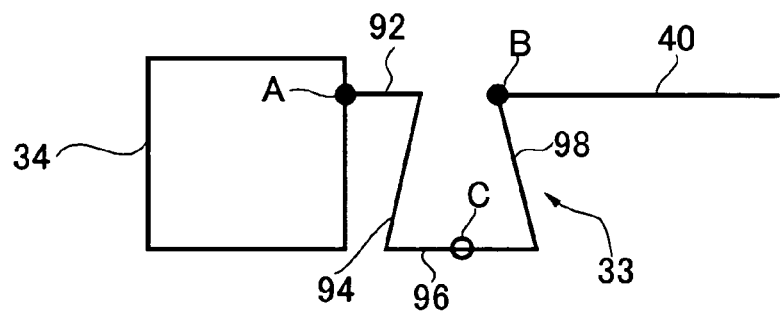
FIG. 17 is a partial sectional view showing a second variation of the groove which is the vibration reducing structure or vibration blocking area of the first embodiment.

In addition, the region D between the bead 80 and the joint with the frame member 34 of the floor panel may be eliminated or made small to eliminate or minimize the surface area of the flat portion that emits large amounts of sound between the frame member 34 which is the source of transmission of vibration and the bead 80 which performs vibration blocking, so it is possible to prevent the generation of noise due to acoustic emission from the region D. In the case of a groove 33, it is possible to eliminate the region by welding directly to the frame member 34 (see FIG. 3 and FIG. 14A), but in the case of providing a groove 33 that becomes wider downward as shown in FIG. 17 to be described later, it is possible to prevent the generation of noise due to acoustic emission from the first horizontal area 92 shown in FIG. 17 by minimizing the size of the first horizontal area 92 which corresponds to the region D described above.

Figure 14C:

FIG. 14C illustrates an example in which a concave curved surface (panel area) 82 is provided in the center of the vehicle panel, a planar area 83 is provided alongside the curved surface 82 and moreover, damping material 42 is disposed on the planar area 83. The curved surface 82 is formed in the shape of a dome where the height of its curve varies continuously in the horizontal directions (vehicle body crosswise direction and vehicle body lengthwise direction), so it is less readily deformed in the up/down direction and horizontal direction than the planar area 83. In this example, a difference in rigidity is formed between the curved surface 82 and planar area 83 in this manner, and damping material 42 is provided on the planar areas 83 which is the low-rigidity area, thus reducing or blocking the transmission of vibration from the frame members 34 to the curved surface (panel area) 82.

Figure 14D:
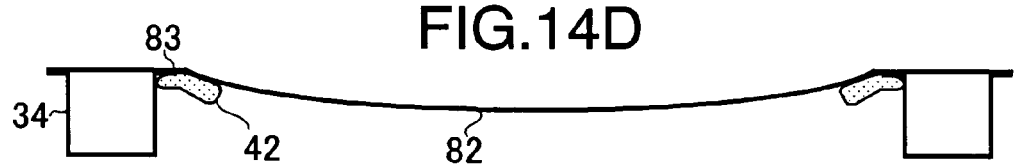

In comparison to the example of FIG. 14C, FIG. 14D illustrates an example in which the curved surface (panel area) 82 extends closer to the frame member 34, so the region of the planar area 83 is narrower. In addition, damping material 42 is disposed on the planar area 83 and curved surface 82 from below. In this example also, the vibration transmitted from the frame members 34 to the curved surface (panel area) 82 is reduced or blocked.

Figure 14E:
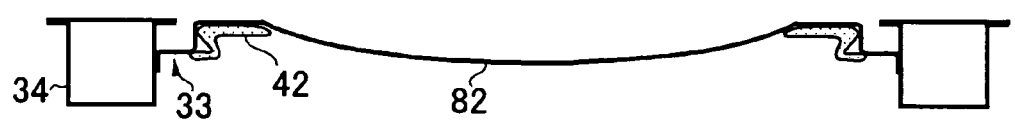
Figure 14F:
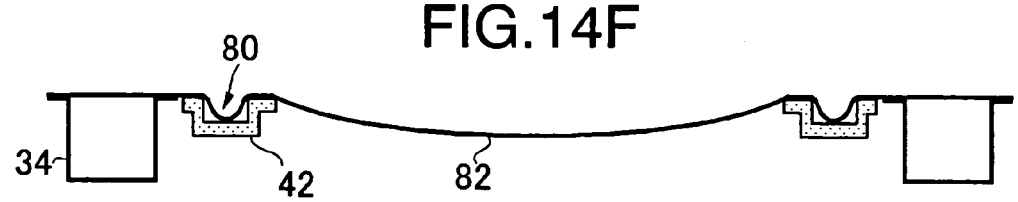
Figure 14G:

FIGS. 14E, 14F and 14G also illustrate examples in which a curved surface (panel area) is provided in the center of the panel area as a high-rigidity area.

FIG. 14E shows an example in which a groove 33 is provided in the periphery of the curved surface (panel area) 82, and damping material 42 is provided on the groove 33, and thereby an even larger difference in rigidity can be created by the curved surface 82 which is the high-rigidity area and the groove 33 which is an area of rigidity lower than that of the flat area, so the damping effect is increased by that much.

FIG. 14F shows an example in which a concave bead 80 is provided in the periphery of the curved surface (panel area) 82, and damping material 42 is provided on the bead 80, and thereby an even larger difference in rigidity can be created by the curved surface 82 which is the high-rigidity area and the bead 80 which is an area of rigidity lower than that of the flat area, so the damping effect is increased by that much.

FIG. 14G shows an example in which a convex bead 80 is formed, thus increasing the damping effect in the same manner as in FIG. 14F.

Note that if the depth of the groove 33 or bead 80 is shallow, its rigidity becomes higher than the rigidity of the panel area 40, so its depth should be set to be somewhat deep in consideration of its depth to width ratio so that its rigidity is lowered.

When the vibration reducing structure (vibration blocking area) according to the embodiment is actually provided in a vehicle, the shape and size of the aforementioned groove 33 or bead 80 are to be set in consideration of various structural constraints of the vehicle; for example, its depth is to be determined in consideration of the magnitude and frequency peaks of the vibrations actually transmitted via the frame members, which are unique to that vehicle itself, along with the thickness, shape and dimensions of the floor panel. In this case, its depth is set so that the rigidity of the groove 33 or bead 80 which is the low-rigidity area is even lower and vibration energy is more concentrated and a large vibration blocking effect can be achieved. Its other dimensions re also similarly determined.

In addition, the curvature of the curved surface (panel area) 82, the width of the planar areas 83 are also similarly set so that vibration is more concentrated in the planar areas 83 which are the low-rigidity areas.

Figure 15:
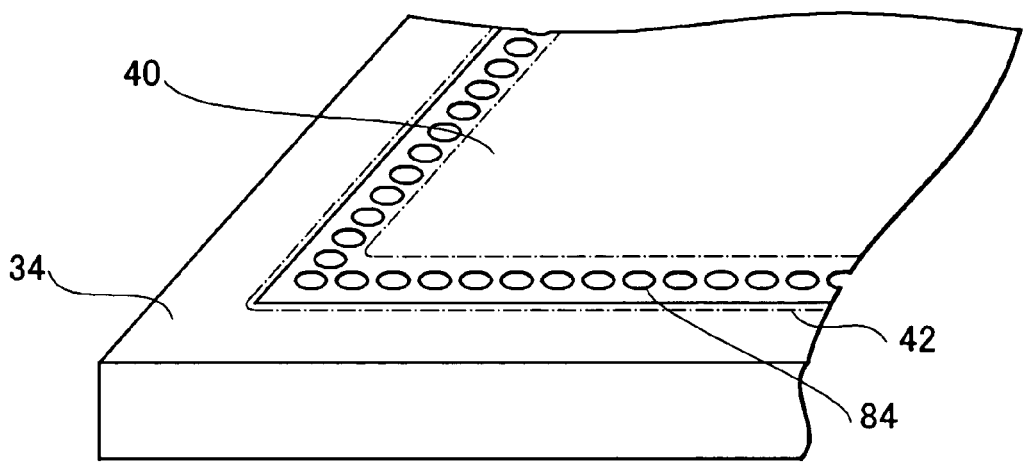
FIG. 15 is a sectional view showing a further variation of the floor panel structure according to the first embodiment.

Here follows a description of a further example of a modification of the floor panel structure of a vehicle body according to the first embodiment of the present invention made with reference to FIG. 15. In this example of modification, the vibration blocking area of the floor panel is formed by a plurality of through holes 84 provided continuously at a fixed pitch near the frame member 34 over the entire periphery of the flat panel area 40 attached to the frame member 34. In this example of modification, damping material 42 (indicated by chain lines) is disposed along the through holes 84 and so as to cover the through holes. The damping material 42 has the function of sealing the through holes 84.

Here follows a description of examples of modification of the groove which is the vibration blocking area of the first embodiment of the present invention.

Figure 16:
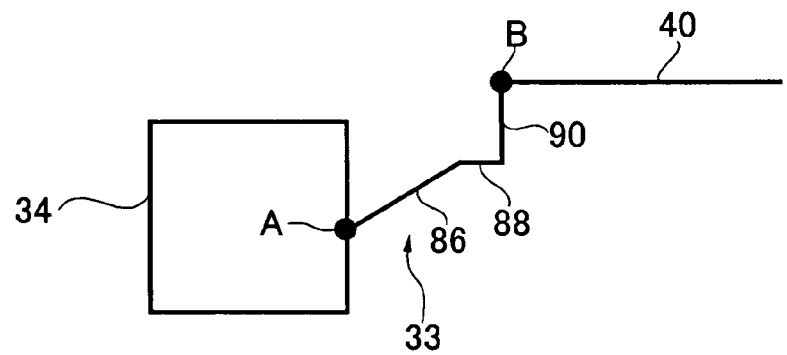
FIG. 16 is a partial sectional view showing a first variation of the groove which is the vibration reducing structure or vibration blocking area of the first embodiment.

First, in the first modification of the groove shown in FIG. 16, the groove 33 includes an inclined area 86 welded to the frame member 34 and extending diagonally upward and inward, a horizontal area 88 extending horizontally inward from the inside edge of the inclined area 86 and a vertical area 90 extending vertically upward from the inside edge of the horizontal area 88, while the panel area (panel surface) 40 extends inward from the upper edge of the vertical area 90. By constituting the groove 33 as the low-rigidity area of the vibration blocking area in this manner, the rigidity of the floor panel in the vertical direction is increased due to the inclined area 86, so it is possible to maintain the feeling of rigidity of the floor when a passenger steps upon the floor panel.

In the second modification of the groove shown in FIG. 17, the groove 33 includes a first horizontal area 92 welded to the frame member 34 and extending inward horizontally, a first inclined area 94 extending diagonally downward and outward from the inside edge of the first horizontal area 92, a second horizontal area 96 extending inward horizontally from the lower edge of the first inclined area 94, a second inclined area 98 extending diagonally upward and outward from the inside edge of the second horizontal area 96, while the panel area (panel surface) 40 extends inward from the upper edge of the second inclined area 98. If the groove 33 is given a shape such that it becomes wider downward in this manner, the boundary edge between the first horizontal area 92 and first inclined area 94, the boundary edge between the first inclined area 94 and the second horizontal area 96, the boundary edge between the second horizontal area 96 and the second inclined area 98, and the boundary edge between the second inclined area 98 and the panel area 40 each serve as a border for bending between each other so vibration readily occurs. Thus, it is possible to make the rigidity of the groove 33 less than that of the panel area 40. Accordingly, together with the effect of the damping material, it is possible to reduce or block vibration transmitted from the frame member 34 to the panel area 40.

Here, the floor panel may be formed by press-forming the groove and panel area as a unit, but in the aforementioned first modification and second modification of the groove, the shape of the groove becomes complex, so press-forming may be difficult.

In this case, in the first modification shown in FIG. 16, the floor panel may consist of two panels: the groove 33 from the weld at point A to point B and the panel area (panel surface) 40, which are each formed by pressing and then welded at points A and B to form a single unit.

In the second modification shown in FIG. 17, the floor panel may consist of two panels: the groove 33 from the weld at point A to point B and the panel area (panel surface) 40, which are each formed by pressing and then welded at points A and B to form a single unit.

Note that the floor panel may also consist of two panels: the portion from point A to point C in the middle of the second horizontal area 96 and the portion inward from the point C (a portion of the groove 33 and the panel area 40), which are each formed by pressing in their shapes.

Furthermore, the floor panel may consist of three panels: the portion from point A to point C in the middle of the second horizontal area 96, the portion from point C to point B and the panel area 40, which are each formed by pressing in their shapes.

Figure 18:
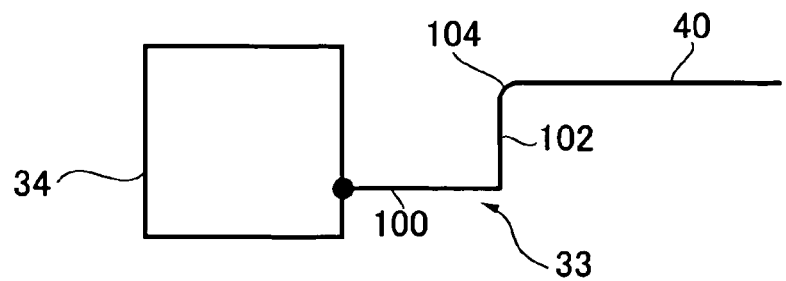
FIG. 18 is a partial sectional view showing a third variation of the groove which is the vibration reducing structure or vibration blocking area of the first embodiment.

In the third modification shown in FIG. 18, the groove 33 has a horizontal area 100 and a vertical area 102, while the boundary area 104 between the vertical area 102 and panel area 40 is a rounded corner (a shape with a curvature of a predetermined radius). By adopting such a rounded corner, it is possible to prevent the boundary area 104 between the vertical area 102 or panel area 40 from suffering fatigue failure due to vibration.

Moreover, in this modification, even in the case that a rounded corner is not provided at the boundary area 104 between the vertical area 102 and the panel area 40, by extending the damping material from the groove to the boundary area 104 so as to cover the boundary area 104, it is possible to suppress the vibration occurring at the boundary area 104 with the damping material and prevent fatigue failure.

A floor panel structure of a vehicle body of a second embodiment of the present invention will be now described with reference to FIGS. 19–22. The floor panel structure of a vehicle body according to the second embodiment of the present invention is applied to the vehicle underbody shown in FIG. 1 described above, and the disposal and other aspects of the basic structure of the frame members 14, 21, 22 (24), 26 and 28 are identical. The second embodiment of the present invention is intended to greatly reduce the vibrations transmitted from the frame members 14, 21, 22 (24), 26 and 28 to the floor panels S1, S2 and S3 in a portion of the floor panel.

As described above, the vibrations transmitted from the engine and suspension to the frame members are at 400 Hz or less, and in the embodiment, by providing a vibration reducing structure (vibration blocking area) for each of the floor panels S1, S2 and S3, vibrations in a wide-range frequency band below 400 Hz. In the second embodiment of the present invention, the front floor panel 2 is formed as a unit, with the floor panels S1, S2, S3 and S4 making up portions of the front floor panel 2 formed as a unit.

The vibration reducing structure provided in floor panels S1, S2 and S3 will be described with reference to FIG. 19 and FIG. 20.

First, as described above, the first floor panel S1 is provided within a space formed by the No. 1 cross member 14, side sills 21, floor side frames 22 (including protrusion 24) and No. 2 cross member 26 which are the frame members, having a curved surface 82 protruding upward from the vehicle body in the center of the region surrounded by these frame members and forming a high-rigidity area, and a planar area 83 forming a flat low-rigidity area over the entire region in the periphery of the curved surface 82, so the planar area 83 is formed as a vibration blocking area due to the difference in rigidity between the curved surface 82 and planar area 83. The outer edges of the planar area 83 are joined to these frame members 14, 21, 22 and 26.

The boundary between the curved surface 82 and planar area 83, namely the outside edge of the curved surface 82, is elliptical. The curved surface 82 is formed in the shape of a dome where the height of its curve varies continuously in the horizontal directions (vehicle body crosswise direction and vehicle body lengthwise direction), so it is less readily deformed in the up/down direction and horizontal direction than the planar area 83.

Moreover, the entire surface of the planar area 83 of the first floor panel S1 is coated with damping material 42.

Next, as described above, the second floor panel S2 is provided within a space formed by the No. 1 cross member 14, floor side frames 22 (including protrusion 24) and No. 2 cross member 26 which are the frame members, having a curved surface 82 protruding upward from the vehicle body in the center of the region surrounded by these frame members and forming a high-rigidity area, and a planar area 83 forming a flat low-rigidity area over the entire region in the periphery of the curved surface 82, so the planar area 83 is formed as a vibration blocking area due to the difference in rigidity between the curved surface 82 and planar area 83. One side of the outer edge of the planar area 83 toward the inside of the vehicle body is formed contiguous to the floor tunnel 20, while the remaining three sides are joined to the frame members 14, 22 and 26.

Figure 19:
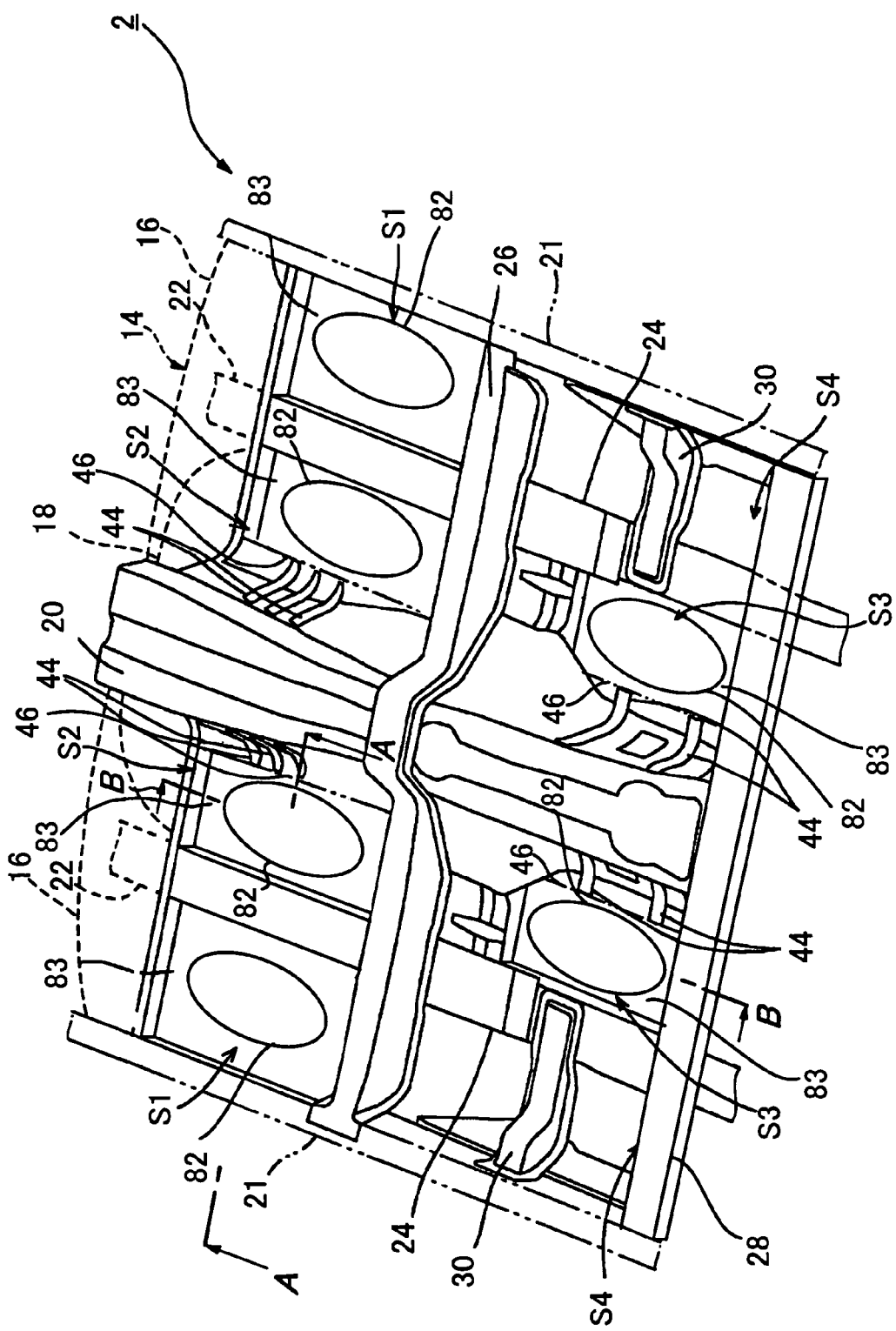
FIG. 19 is a perspective view showing the floor panel structure of a vehicle body according to a second embodiment of the present invention.
Figure 20:
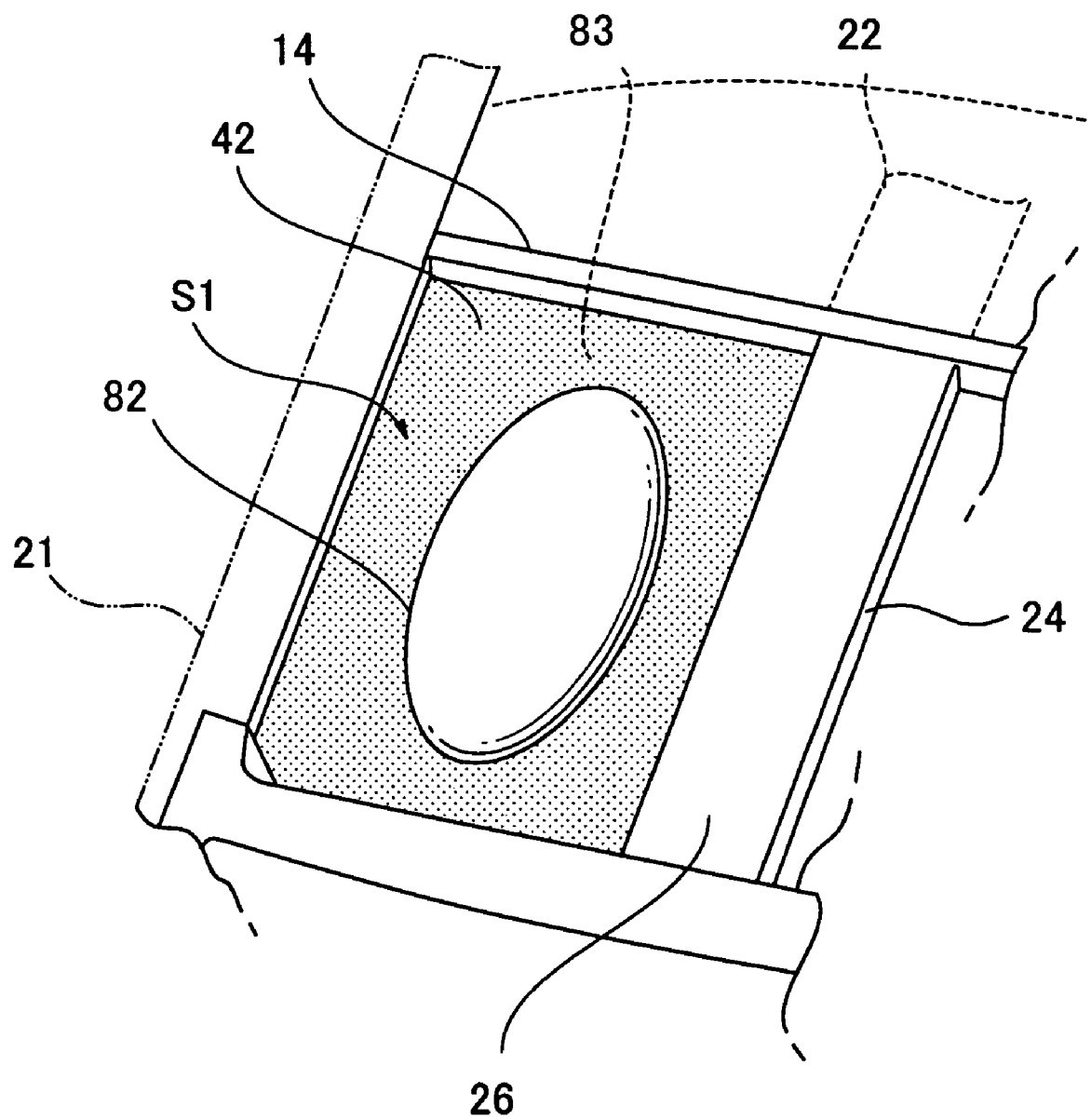
FIG. 20 is a partially enlarged view showing a first floor panel according to the second embodiment.

Moreover, as shown in FIG. 19, in the portion of the second floor panel S2 near the boundary with the floor tunnel 20 which is the forward portion on the inside edge, a plurality of beads 44 is provided with front/back clearance and extending in the vehicle body crosswise direction so as to straddle the side surface of the floor tunnel 20 and the second floor panel S2. The positions of the vehicle body outward sides of these beads 44 are aligned so as to line up along a line 46 indicated by the two-dot chain line in FIG. 19, passing through the positions of the fringes of the floor tunnel 20 in the rear part of the second floor panel S2, so the region of the planar area 83 is thus defined.

In the second floor panel S2 also, in the same manner as second floor panel S2, the curved surface 82 is formed in the shape of a dome with an elliptical outside edge, and the entire surface of the planar area 83 is coated with damping material 42.

Moreover, the third floor panel S3 is provided within a space formed by the floor side frames 22 (including protrusion 24), No. 2 cross member 26 and No. 3 cross member 28 which are the frame members, having a curved surface 82 protruding upward from the vehicle body in the center of the region surrounded by these frame members and forming a high-rigidity area, and a planar area 83 forming a flat low-rigidity area over the entire region in the periphery of the curved surface 82, so the planar area 83 is formed as a vibration blocking area due to the difference in rigidity between the curved surface 82 and planar area 83, one side of the outer edge of the planar area 83 toward the inside of the vehicle body is formed contiguous to the floor tunnel 20, while the remaining three sides are joined to the frame members 22 (24), 26 and 28.

In the third floor panel S3 also, in the same manner as for second floor panel S2, in order to define the region of the vertical area 38, as shown in FIG. 19, a plurality of beads 44 is provided on the floor tunnel 20. In the third floor panel S3 also, the positions of the vehicle body outward sides of these beads 44 are aligned so as to line up along a line 46 indicated by the two-dot chain line in FIG. 19.

In the same manner as the first floor panel S1, the curved surface 82 is formed in the shape of a dome with a elliptical outside edge, and the entire surface of the planar area 83 is coated with damping material 42.

The fourth floor panel S4 is defined as a region surrounded by the side sills 21, the floor side frames 22 (including protrusion 24), No. 2 cross member 26 and No. 3 cross member 28 which are the frame members. Moreover, the fourth floor panel S4 is joined to these frame members 21, 22, 26 and 28. Here, the rigidity of the fourth floor panel S4 is adjusted so that its natural frequency becomes 400 Hz or greater.

Here follows a description of the cross-sectional structure of the front floor panel 2 which has the vibration reducing structure according to the embodiment, with reference to FIG. 21 and FIG. 22. FIG. 21 is a cross section of the floor panel in the vehicle body crosswise direction along A—A of FIG. 19. FIG. 22 is a cross section of the second floor panel S2 and third floor panel S3 in the vehicle lengthwise direction along B—B of FIG. 19.

The shape of the curved surface 82 and planar area 83 will be described. As shown in FIG. 21 and FIG. 22, the curved surfaces 82 of the floor panels S1, S2 and S3 each protrudes upward and their cross-sectional shape consists of a curved surface with a continuously varying curvature. In the embodiment, the curved surface 82 is formed with a three-dimensional shape in which the cross section is a section of a substantially elliptical sphere. On the other hand, the planar areas 83 are substantially flat having no curvature.

The curved surface 82 rises at a stipulated angle from the boundary point E with the planar area 83. In other words, because the boundary point E is bent at a sharp angle, the curvature and direction normal to the planar area 83 and curved surface 82 become discontinuous at the boundary point E. Here, the stipulated angle is determined depending on the shape, size and height of the curved surface so that the rigidity of the curved surface 82 is increased.

Here follows a description of the structure of the portions where the floor panels S1, S2 and S3 connect to the frame members.

As shown in FIG. 21, the vehicle body outward edge of the planar area 83 of the first floor panel S1 is joined by welding to the side surface of the side sill 21.

In addition, a protrusion 24 formed as a unit with the panel (front floor panel 2) consisting of the curved surface 82 and planar area 83 is provided between the first floor panel S1 and the second floor panel S2, and the protrusion 24 is joined by welding to the floor side frames 22.

Moreover, the floor tunnel 20 is formed continuously on the vehicle body inward side of the second floor panel S2. A plurality of beads 44 is provided on the floor tunnel 20 in order to define a region of the planar area 83 on the vehicle body inward side of the second floor panel S2 as described above.

Next, as shown in FIG. 22, the front edge of the planar area 83 of the second floor panel S2 is joined by welding to the side surface of the No. 1 cross member 14. In addition, the front edge of the planar area 83 of the first floor panel S1 is also similarly joined by welding to the side surface of the No. 1 cross member 14.

In addition, the No. 2 cross member 26 is joined by welding above the front floor panel 2 between the second floor panel S2 and third floor panel S3.

While not shown, the No. 2 cross member 26 is joined by welding above the front floor panel 2 also between the first floor panel S1 and the fourth floor panel S4.

On the vehicle body rearward side of the third floor panel S3, the No. 3 cross member 28 is joined by welding to the vehicle rearward edge of the front floor panel 2.

Next, the arrangement of the damping material 42 on the various floor panels will be described with reference to FIGS. 20–22.

As described above, the entire surface of each of the planar areas 83 is coated with damping material 42. Specifically, this is as follows.

First, as shown in FIG. 21 and FIG. 22, in the first floor panel S1, two sides of the outside edge of the planar area 83 are joined by welding to the side surfaces of the No. 1 cross member 14 and side sill 21 which are frame members, and the remaining two sides of the outside edge are joined by welding to the floor side frames 22 and No. 2 cross member 26. In addition, the inside edge of the planar area 83 of the first floor panel S1 is in contact with the rising area 82a of the curved surface 82. For this reason, the planar area 83 forms a groove shape with frame members 14, 21, 22 (including the protrusion 24), 26 and the rising area 82a of the curved surface 82, while the entire surface of the planar area 83 which forms the groove shape is coated with damping material 42 as described later. Here, damping material 42 is adhered to the side surface of the frame members 14, 21, 22 (including the protrusion 24), 26 and the rising area 82a of the curved surface 82.

In addition, in the second floor panel S2 also, the planar area 83 similarly forms a groove shape with frame members 14, 22 (including the protrusion 24), 26 and the rising area 20a of the floor tunnel 20, while the entire surface of the planar area 83 which forms the groove shape is coated with damping material 42 as described later. Here, damping material 42 is adhered to the side surfaces of the frame members 14, 22 (including the protrusion 24), 26, the rising area 20a of the floor tunnel 20, planar area 83 and the rising area 82a of the curved surface 82.

Moreover, in the third floor panel S3 also, the planar area 83 similarly forms a groove shape with frame members 22 (including the protrusion 24), 26, 28 and the rising area 20a of the floor tunnel 20, while the entire surface of the planar area 83 which forms the groove shape is coated with damping material 42 as described later. Here, damping material 42 is adhered to the side surfaces of the frame members 22 (including the protrusion 24), 26, 28, the rising area 20a of the floor tunnel 20, planar area 83 and the rising area 82a of the curved surface 82.

Note that in the embodiment, the front floor panel 2 is formed by press-forming from a single panel, with the various floor panels S1, S2, S3 and S4 constituting a portion thereof, but the present invention is not limited thereto. For example, the first floor panel S1 may be press-formed alone, while the remaining second floor panel S2, third floor panel S3 and fourth floor panel S4 may be press-formed from a single panel.

An operation of the floor panel structure according to the second embodiment of the present invention will be now described.

In the embodiment, a planar area (low-rigidity area) 83 with rigidity lower than that of the curved surface (panel area) 82 is provided in each of the floor panels S1, S2 and S3, so vibration transmitted from the frame members to the floor panel causes the planar area (low-rigidity area) 83 to vibrate greatly and also, damping material 42 is disposed in a concentrated manner upon the planar area 83 to greatly damp the vibration.

Thus, the frame members are subject to vibration in various directions including the vehicle body up/down direction, horizontal directions (vehicle body crosswise direction and vehicle body lengthwise direction) and rotation about the axes of the frame members, and the planar areas 83 subjected to these vibrations have a lower rigidity than the frame members, so they vibrate greatly. On the other hand, the curved surface 82 has its rigidity increased to greater than that of the planar areas 83 due to its curved shape, so it does not readily vibrate.

Moreover, on the floor panels S1, S2 and S3, the planar area 83 is formed as a vibration blocking area due to the difference in rigidity between the curved surface 82 and the planar area 83. The vibration transmitted from the frame members to the high-rigidity area (curved surface 82) is blocked by the planar area 83, and thus the amount of vibration transmitted is reduced.

In addition, a more pronounced vibration blocking effect is achieved by providing damping material 42 on the planar areas 83 which is the low-rigidity area, so the vibration is greatly damped in the planar area 83.

Here follows a description of the structural characteristics of such a floor panel with reference to FIG. 23.

FIG. 23A is a schematic sectional view showing the sectional structure in the vehicle body crosswise direction of the first floor panel S1 as a representative example, while FIG. 23B is a qualitative representation of the difference in rigidity of the various areas of the floor panel.

As shown in FIG. 23B, there is a difference in rigidity between the planar area 83 and curved surface 82, and the greater this difference in rigidity, the more easily the planar area 83 vibrates in comparison to the curved surface 82, and moreover, by providing damping material 42 on the planar area 83, a greater damping effect and vibration blocking effect are exhibited. In addition, the rigidity is discontinuous with the boundary between the planar area 83 and curved surface 82 as the border, so a difference in the magnitude of vibration occurs markedly between the planar area 83 and curved surface 82, so a greater effect of the damping material 42 can be exhibited.

Next, FIG. 23C presents the distribution of strain energy occurring in the floor panel according to the embodiment together with the strain energy portion of the conventional floor panel that is flat over its entire surface. FIG. 23C illustrates the results of performing analysis by replacing the floor panel according to the embodiment and the conventional floor panel with FEM analysis models.

As shown in FIG. 23C, the strain energy is distributed over the entire surface of the panel in a conventional floor panel. That is, in the conventional floor panel, its rigidity is constant over the entire surface and large bending vibrations occur easily over its entire surface due to the vibration of the frame members.

On the other hand, in the floor panel according to the embodiment, the strain energy occurring in the planar area 83 becomes much larger than the strain energy of the curved surface 82. In this manner, the reason why vibration energy is concentrated in the planar area 83 is because the planar area 83 has a lower rigidity than the curved surface 82 and vibrates more readily as described above. On the other hand, by providing damping material 42 on the planar area 83 where vibration energy is concentrated in this manner, the vibration transmitted from the frame members to the floor panel is greatly damped and the vibration transmitted to the curved surface 82 can be reduced or blocked.

Here follows a description of the vibration reducing or blocking characteristics of the floor panel damping material according to the second embodiment of the present invention.

Figure 24A:
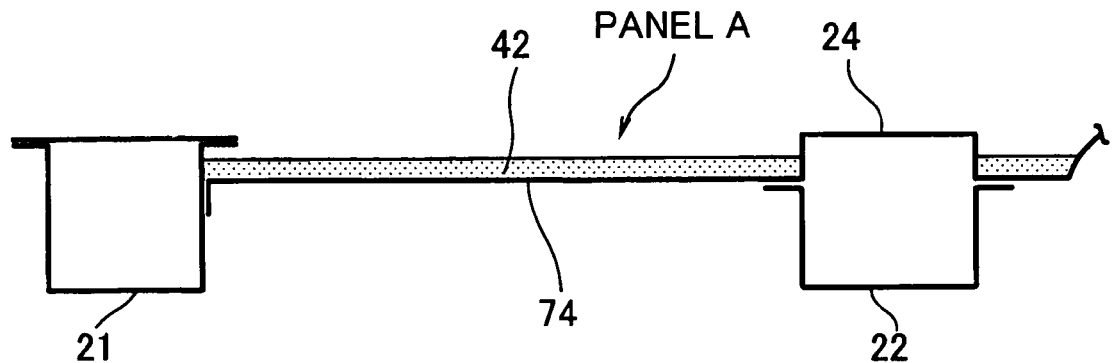
FIGS. 24A, 24B, and 24C are schematic sectional views showing a conventional floor panel that is flat over its entire surface (FIG. 24A), a conventional floor panel that has damping material attached to the entire surface of its curved surfaces and planar areas (FIG. 24B), and a floorpanel (FIG. 24C) according to the second embodiment, in order to describe the vibration-reducing characteristics of the second embodiment of the present invention.
Figure 24B:
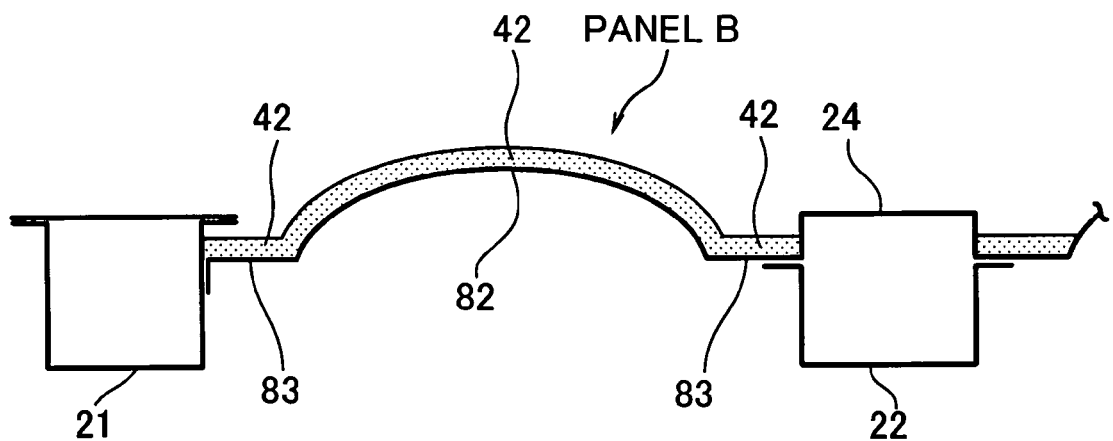
Figure 24C:
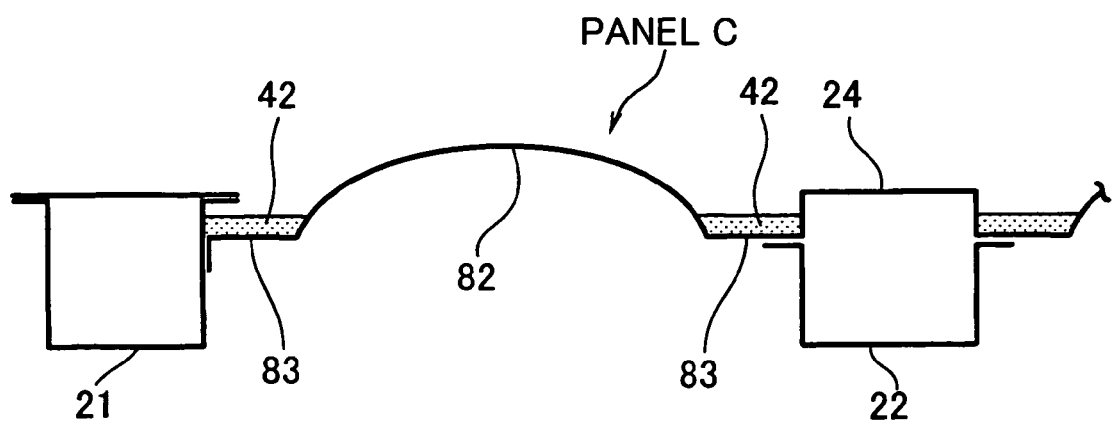

In order to confirm the vibration damping effect of the embodiment, panel A, panel B and panel C shown in FIG. 24 are prepared and disposed in the region of the first floor panel S1 and the second floor panel S2 shown in FIG. 19. A shaker was used to apply a shaking force F in a frequency band below 400 Hz (white noise) to the lower arm of the double wishbone suspension attached to a suspension cross member of the underbody, and the acoustic emission power P of each panel surface was measured. Here, panel A is a conventional panel 74 that is flat over its entire surface and that has damping material 42 applied to its entire surface; panel B is a panel in which damping material 42 is applied to the entire surface of the planar area 83 and curved surface (panel area) 82; while panel C is a panel according to the embodiment with damping material 42 applied only to the planar area 83.

Figure 25:
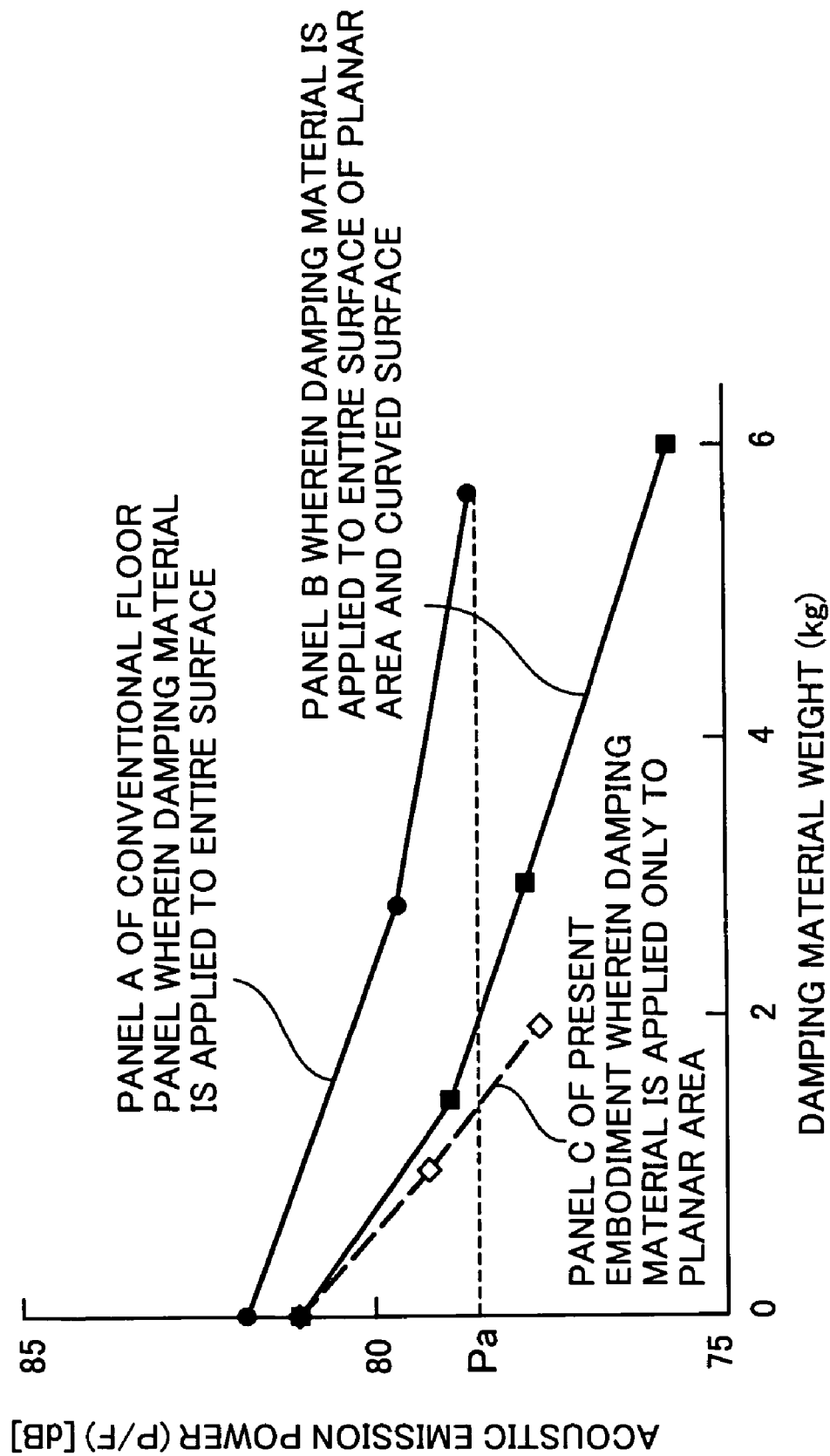
FIG. 25 is a plot showing the vibration-reducing characteristics according to the second embodiment of the present invention.

FIG. 25 presents a plot illustrating the relationship between the weight of damping material and the acoustic emission power obtained from this experiment.

As is evident from FIG. 25, the weight of damping material required to reduce the acoustic emission power down to the acoustic emission power of $P_a$, for example, is approximately 5.8 kg for the conventional panel A with damping material applied to its entire surface but approximately 1.4 kg for panel C according to the embodiment with damping material applied only to the planar areas, so the weight of damping material required to go down to the same acoustic emission power is reduced to approximately one-fourth. In panel C, the acoustic emission power can be greatly reduced by damping material disposed on only the greatly vibrating planar area (low-rigidity area) along with the aforementioned vibration reducing structure of the low-rigidity area.

In addition, regarding the case in which the weight of damping material is 0 kg, in comparison to the conventional panel A, the acoustic emission power was reduced in the floor panels (panels B and C) that have the planar area 83 and curved surface 82. As described above, this is due to the vibration blocking effect of the difference in rigidity between the low-rigidity area (planar area) and high-rigidity area (curved surface) of the panel.

Moreover, with panel B which has damping material 42 applied over the entire surface of the planar area 83 and curved surface 82, the weight of damping material required to reduce the acoustic emission power down to $P_a$ becomes approximately 2 kg, so the weight of damping material required to come down to the same acoustic emission power is reduced to approximately one-third of that for the conventional panel A.

Moreover, as is evident from FIG. 25, taking the weight of damping material to be 2 kg, for example, the acoustic emission power generated from each panel when using the same weight of damping material is approximately 80 dB with the conventional panel A, but approximately 76 dB with panel C in which damping material is provided only on the planar areas and approximately 77 dB with panel B in which damping material is provided on the entire surface of the planar area 83 and curved surface 82, according to the embodiment, so a greater vibration damping effect is obtained when the same weight of damping material is provided.

As described above, according to the floor panel (panel C) of the embodiment, the same degree of vibration damping effect as in the conventional design can be obtained with a smaller amount of damping material so the amount of damping material used can be greatly reduced, thus achieving lighter weight vehicle bodies and reduced costs. Conversely, it is possible to obtain a greater vibration damping effect with the same amount of damping material.

As described above, when damping material 42 is provided on the planar area 83, a large damping effect is obtained, so rather than disposing damping material over the entire surface of the floor panel, by disposing damping material on only the planar area 83, a large vibration damping effect can be achieved with a smaller weight of damping material, so vibration of the floor panel can be reduced.

Moreover, by providing an even larger weight of damping material on the planar area, it is possible to dispose a relatively small weight of damping material on the curved surface. In this case, it is possible to dispose damping material with a greater damping performance, or damping force, upon the planar area 83 and apply damping material with a smaller damping performance or thinner thickness upon the curved surface 82.

Figure 26:
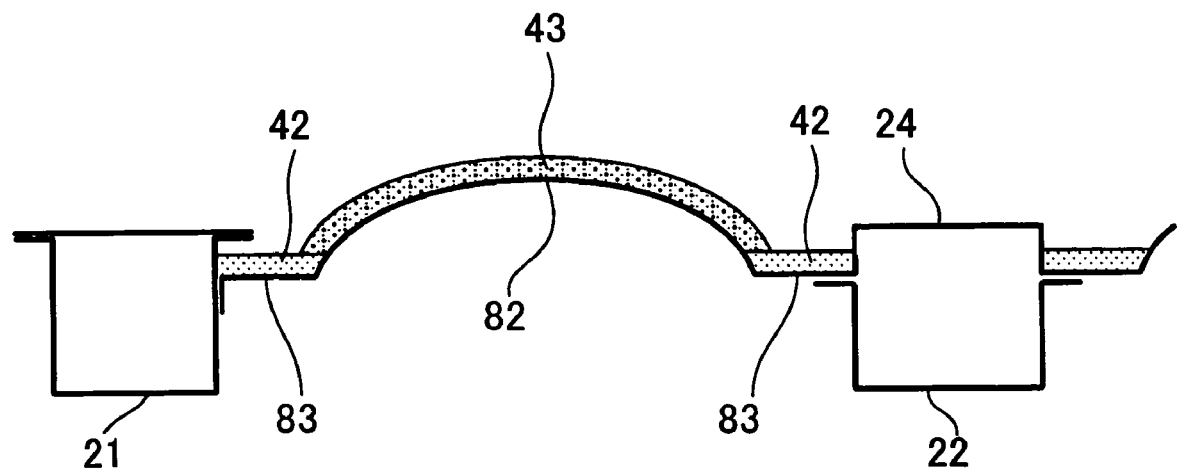
FIG. 26 is a schematic sectional view of a floor panel having the floor panel of FIG. 23 to which additional noise-absorbing material is applied.

On the other hand, there are cases in which acoustic emission due to the so-called sound transmission, wherein the floor panel is vibrated directly, becomes a problem in addition to engine or suspension vibration transmitted via the frame members. In order to prevent the acoustic emission, as shown in FIG. 26, it is effective to dispose damping material 42 with a large damping performance or damping force upon the planar area 83 and apply sound absorbent 43 to the curved surface 82 in order to prevent noise due to noise transmission.

One example of a modification of the damping material 42 disposed on the planar area 83 will be described with reference to FIG. 27. As a representative example, FIG. 27 is an enlargement of portions of the planar area 83 and damping material 42 on the vehicle body outward side of the first floor panel S1.

Figure 27:
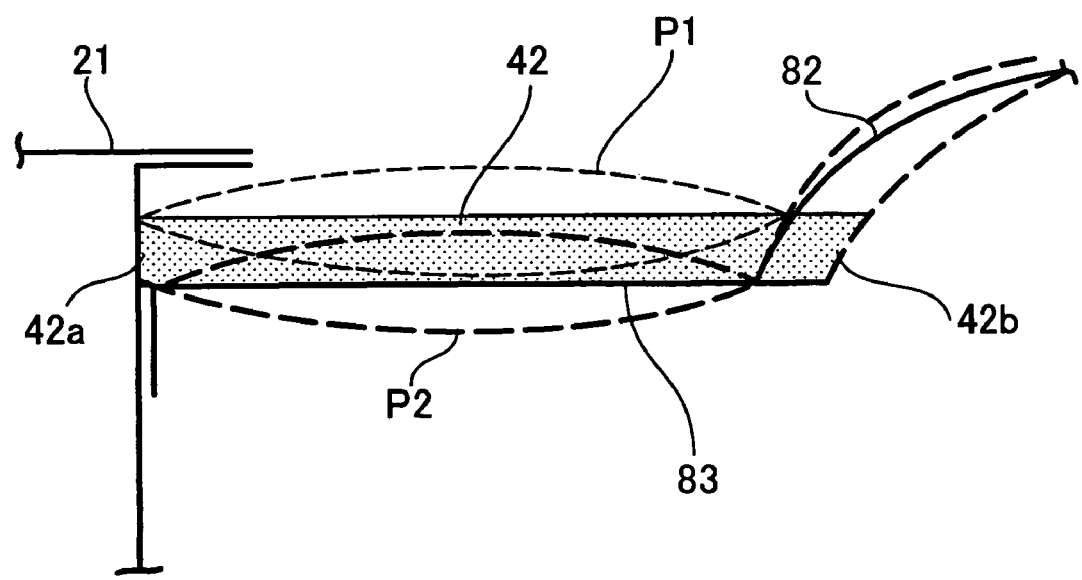
FIG. 27 is an partially enlarged view of the planar areas and damping material of the vibration reducing or blocking structure of the second embodiment.

In FIG. 27, the solid lines indicate the planar area 83, curved surface 82 and damping material 42 in the static state, while the broken lines indicate them in the deformed state.

As described above, the damping material 42 is adhered to the frame members 14, 21, 22 (including the protrusion 24), 26, 28 and the rising area 20*a* of the floor tunnel 20 and rising area 82*a* of the curved surface 82. In this example, the damping material 42 is greatly curved by the bending deformation of the planar area 83 and also deformed by mutual displacement between the portion 42*a* adhered to the frame and the portion 42*b* adhered to the rising part of the curved surface 82. In such a deformed state, the damping material 42 is subjected to shearing deformation and is also subjected to compression/expansion deformation between the portion 42*a* adhered to the frame and the portion 42*b* adhered to the rising part of the curved surface 82. For example, when the damping material 42 vibrates between the state indicated by broken line P1 and the state of broken line P2, expansion and compression are repeated through relative displacement between the portion 42*a* adhered to the frame and the portion 42*b* adhered to the rising part of the curved surface 82, and moreover, undergoes shearing deformation between the portion 42*a* adhered to the frame and the portion 42*b* adhered to the fringes of the planar area 83 and curved surface 82.

In this manner, the damping material 42 undergoes greater strain and its deformed states are more complex in comparison to the conventional floor panel structure which the sheets of damping material applied to the panel undergo strain only due to expansion and contraction by bending vibration of the panel, so its damping effect and attenuation effect are extremely large.

In the embodiment, one curved surface 82 is provided on each of the floor panels S1, S2 and S3. By providing one curved surface on each floor panel in this manner, the state of the planar area becomes simpler and vibrates more readily than in the case that a plurality of curved surfaces is provided.

On the other hand, if a plurality of curved areas is provided, certain specific vibration modes occur readily so acoustic emission from the floor panel becomes greater, but as described later as a third embodiment, it is possible to proactively provide two or more curved surfaces in order to generate specific vibration modes at specific frequencies in the floor panel and thus have the additional function of the vibration mode adjusting structure to be described later.

Note that the curved surface 82 may also protrude downward.

Furthermore, in the embodiment, in order to increase the rigidity of the curved surface 82, its boundary with the planar area 83, namely the outside edge of the curved surface 82 is made elliptical.

Here, to increase the rigidity of the curved surface 82, it is sufficient to increase the depth (height) of the curved surface 82, but when the curved surface 82 is made to protrude upward, in order to make the floor within the cabin flat, measures such as altering the shape and layout of the floor mats or the like spread on the front floor panel 2 must be taken, so if the height of the curved surface 82 protruding into the cabin is too high, it may become difficult to install floor mats or the feeling of comfort when stepping on the floor may deteriorate. On the other hand, if the curved surface 82 is made to protrude downward, then it may interfere with the fuel tank, exhaust pipe, catalytic converter and the like provided below the floor, so the height of the curved surface 82 cannot be made excessively large.

Here, it is best to keep the height of the curved surface 82 constant and in order to increase its rigidity, the shape of the outside edge of the curved surface should be made circular or elliptical.

As described above, with the floor panel of the second embodiment of the present invention, the same vibration damping effect as with the conventional design can be obtained with less damping material than used conventionally, so the vehicle body can be made lighter and costs can be reduced. Conversely, a greater vibration damping effect can be obtained with the same amount of damping material. In addition, with the vibration reducing (blocking) structure provided in the floor panel structure of a vehicle body according to the embodiment, it is possible to reduce vibration in a wide band of frequencies below 400 Hz and reduce acoustic emission from the floor panels S1, S2 and S3.

A floor panel structure of a vehicle body according to the third embodiment of the present invention will be now described with reference to FIG. 28.

As described above, the floor panel structure of a vehicle body according to the embodiment has a curved surface 82 and planar area 83 provided as a vibration reducing (blocking) structure, and by providing damping material 42 on the planar area 83, it is possible to reduce noise due to vibration in a wide frequency band below 400 Hz.

In addition, as described above, as vibration transmitted through the frame members, vibration from the engine itself and road noise transmitted from the suspension become problems. Among these, road noise is typically due to tire cavity resonance and resonance of the suspension, where the peak of road noise due to tire cavity resonance typically appears in a frequency band in the range 200–300 Hz, while the peak of road noise due to resonance of the suspension appears in a band below 200 Hz. Among these, road noise due to tire cavity resonance in particular often becomes a problem.

For this reason, in the floor panel structure of a vehicle body according to the third embodiment, the vibration reducing or blocking structure according to the second embodiment of the present invention described above also serves as the aforementioned vibration mode adjusting structure (vibration mode adjusting area), thus further reducing acoustic emission due to vibration caused by tire cavity resonance.

The vibration mode adjusting structure (vibration mode adjusting area) in the floor panel structure of a vehicle body according to the third embodiment induces the floor panel to vibrate in a vibration mode with a low acoustic emission efficiency at a specific frequency, in the embodiment, a frequency near 250 Hz, for example.

Figure 28:
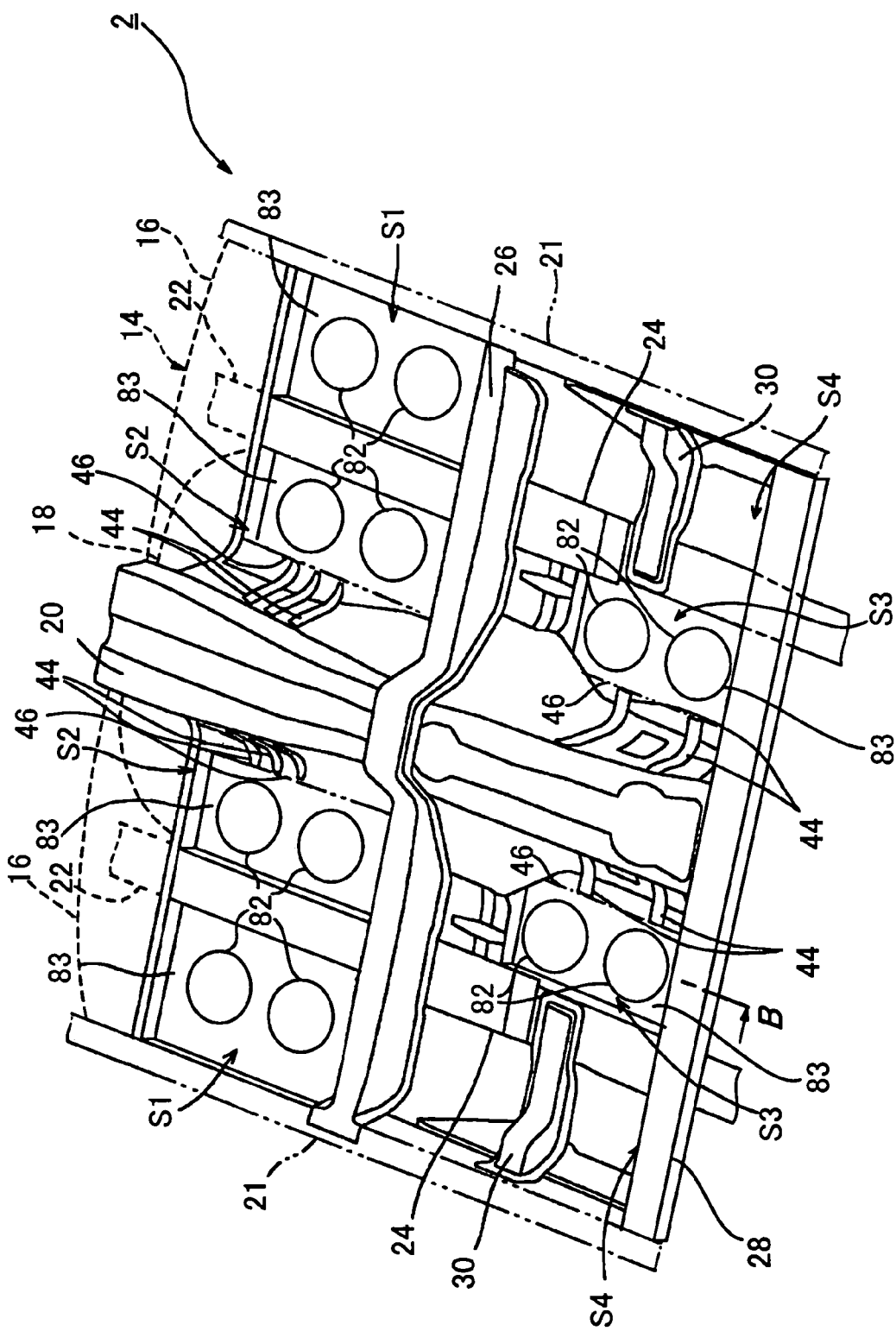
FIG. 28 is a perspective view showing the floor panel structure of a vehicle body according to a third embodiment of the present invention.

In the third embodiment, as shown in FIG. 28, the first floor panel S1 is formed with two curved surfaces 82 having substantially circular outside edges lined up in the vehicle body lengthwise direction, while a planar area 83 is formed in the remaining portions. These curved surfaces 82 are formed such that the front and rear substantially circular convex curved surfaces of the first floor panel S1 each protrude upward. In addition, in the same manner as in the second embodiment, the entire surface of the planar area 83 is coated with damping material 42.

In addition, the first floor panel S1 has a rectangular shape where its length in the vehicle lengthwise direction and length in the vehicle body crosswise direction are substantially 2×1 proportions.

By providing two curved surfaces 82 in the vehicle body lengthwise direction in this manner, and also by forming panel S1 as a substantially 2×1 rectangular shape, the 2×1 vibration mode described above can be readily generated.

Like the first floor panel S1, the second floor panel S2 is also formed with two curved surfaces 82 and planar areas 83 and the entire surface of the planar area 83 is coated with damping material 42.

In addition, because the rising area of the floor tunnel 20 varies on its vehicle body inward side, the second floor panel S2 differs from the first floor panel S1 in that it is formed with a non-rectangular shape where its width in front is wider than its width in back. Thus, a plurality of beads 44 which define a region of the second floor panel S2 is provided, and the second floor panel S2 is formed such that the interval between the line 46, extending in the vehicle body lengthwise direction along vehicle body outward sides of the plurality of beads 44 and the fringes of the floor tunnel 20 behind these beads 44, and the facing floor side frame 22, or namely the dimension in the vehicle width direction of the second floor panel S2 is roughly constant over the entire length in the vehicle body lengthwise direction. In addition, these beads 44 also define a region of the planar area 83.

As a result, in the second floor panel S2, the region surrounded by the frame members 14, 22, 26 which surround the second floor panel S2 on three sides and the two-dot chain line 46 is a rectangle that has a length in the direction of vehicle travel and length in the vehicle body crosswise direction that are in the proportion of substantially 2×1.

Like the first floor panel S1, the third floor panel S3 is also formed with two curved surfaces 82 and planar areas 83 and the entire surface of the planar area 83 is coated with damping material 42.

In addition, like the second floor panel S2, the third floor panel S3 is provided with a plurality of beads 44, and the region surrounded by the frame members 22, 26, 28 which surround the third floor panel S3 on three sides and the two-dot chain line 46 is a rectangle that has a length in the direction of vehicle travel and length in the vehicle body crosswise direction that are in the proportion of substantially 2×1.

Note that in the embodiment, the curved surface 82 may also protrude downward.

In the third embodiment, in the floor panels S1, S2 and S3, respectively, the shape and depth and the like of the curved surface 82 and the thickness of the floor panel are adjusted so that vibration in the 2×1 mode is generated at a specific frequency (250 Hz). Specifically, the resonance frequency of the floor panel in the 2×1 mode is made to be below 250 Hz before forming the curved surface 82, and by forming the curved surface 82 the resonance frequency of the floor panel in the 2×1 mode is raised to 250 Hz. Note that substantially cross-shaped or radial concavo-convex lines that serve for both rigidity adjustment and slip prevention may also be formed on each curved surface 82.

In the third embodiment, by appropriately modifying the shape and depth of these curved surfaces 82, it is possible to reliably induce vibration in the 2×1 mode with respect to vibration input in the aforementioned stipulated frequency band, namely frequencies near 250 Hz, and thus it is possible to make the acoustic emission efficiency extremely low by inducing mutual cancellation of sound emitted from adjacent opposite-phase portions in each floor panel (cancellation of emitted sound).

An operation of the floor panel structure according to third embodiment of the present invention will be described.

In the third embodiment, with the curved surface 82 formed as the high-rigidity area, the planar area 83 formed as the low-rigidity area and the damping material 42 provided upon the planar area 83, the aforementioned floor panels S1–S3 damp vibrations mainly below 400 Hz with a smaller amount of damping material than conventionally used and also block vibrations in a frequency region mainly below 400 Hz transmitted from the frame members to the curved surface 82, and moreover, with the vibration mode adjusting structure consisting of the curved surface 82 and planar area 83, prevent the excitation of 2×1 vibration modes with a low acoustic emission efficiency with respect to vibration input in the stipulated frequency band (200–300 Hz), and particularly with respect to vibration input at roughly 250 Hz.

According to the floor panel structure of a vehicle body of the third embodiment, it is possible to reduce vibration and also reduce acoustic emission with the curved surface 82, planar area 83 and damping material 42 provided on the planar area 83 which also serve as the vibration mode adjusting structure (vibration mode adjusting area).

Here in the aforementioned second embodiment and third embodiment, the shape and size of the curved surface 82 and planar area 83, for example the depth and shape of the curved surface (distribution of curvature, etc.) are determined in consideration of the magnitude of vibration actually transmitted via the frame members, the peak frequency, thickness, shape and dimensions of the floor panel, which are specific to the vehicle itself, along with various other structural constraints of the vehicle and the like. In this case, the depth of each are set so that the rigidity of the planar area 83 which is the low-rigidity area becomes lower and better concentrates vibration energy, and so that a greater vibration blocking effect is achieved.

The method used to attach damping material to the groove, beads and planar area in first, second and third embodiments of the present invention will be described.

Figure 29A:
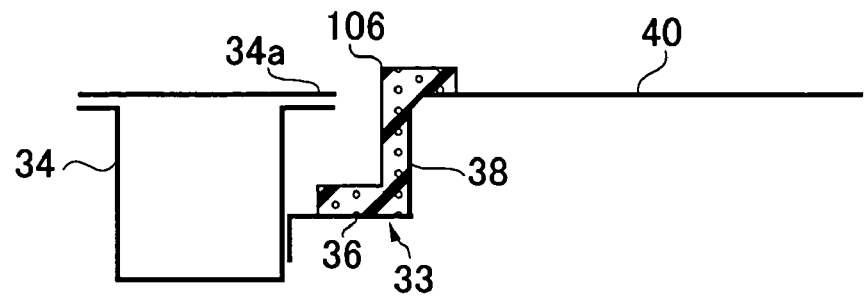
FIGS. 29A and 29B are partially enlarged sectional views of a floor panel used to describe a first method of installing damping material in the first embodiment.

The first damping material installation method illustrated in FIG. 29 involves: first, as shown in FIG. 29(A), after the horizontal area 36 of the groove 33 of the first embodiment is welded to the frame members 34, foam rubber 106 is continuously applied around the entire groove 33 along the horizontal area 36 and vertical area 38 of the groove 33 and part of the panel area 40. In this case, the shape of the foam rubber 106 and position where it is attached may be arbitrary as long as the foam rubber 106 fills up the groove 33 after foaming. For example, the foam rubber 106 may be disposed upon the horizontal area 36. In addition, if it is possible to fill up the groove over the entire groove after foaming, the foam rubber may be applied discontinuously in several lines of fixed lengths.

Figure 29B:
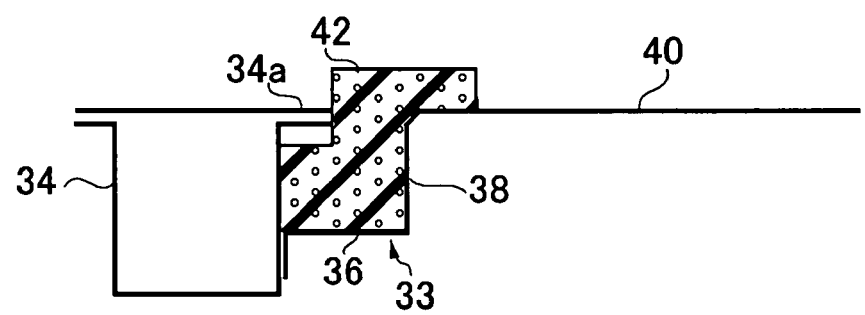

Thereafter, in the process of drying coatings, the foam rubber 106 is foamed in a drying oven (not shown), and the damping material 42 in the final shape is installed as shown in FIG. 29B.

With the first damping material installation method, the frame members 34 have a flange 34a used for joining, and the flange 34a is positioned above the groove 33, so after the foam rubber is dried, it is kept reliably within the groove by the flange 34a and the groove 33 itself.

Note that as shown in the aforementioned FIGS. 14B, C, D, F and G, also when damping material is installed in the case of using a bead 80 or planar area 83 as the low-rigidity area, it is sufficient to apply the foam rubber 106 to the bead 80 or planar area 83 and thereafter in the step of drying coatings, it may be foamed in a drying oven.

Figure 30:
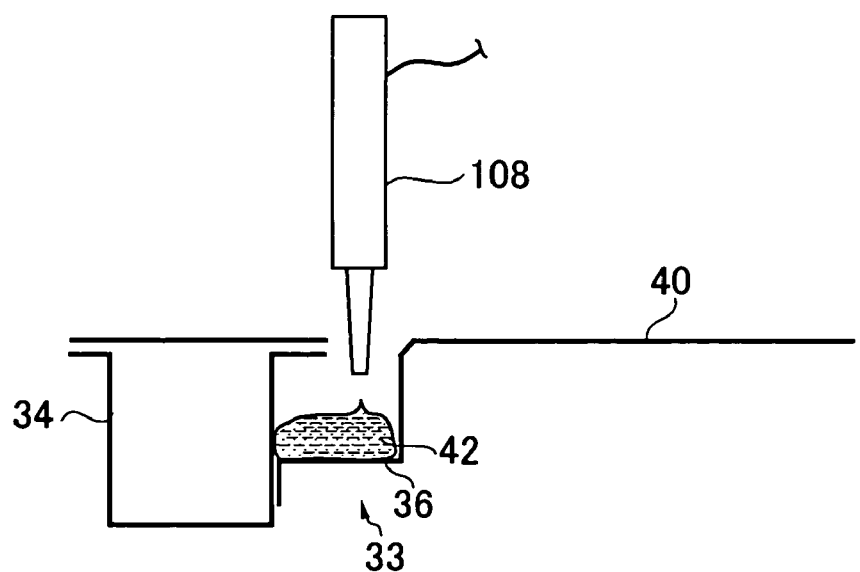
FIG. 30 is a partially enlarged sectional view of a floor panel used to describe a second method of installing damping material in the first embodiment.

The second damping material installation method illustrated in FIG. 30 involves, after the horizontal area 36 of the groove 33 is welded to the frame members 34, an injection gun 108 is used to inject liquid rubber or other liquid damping material 42 around the entire groove 33. Here, the damping material 42 is not limited to being liquid rubber as long as it is a liquid substance having damping functions that can be injected with the injection gun 108. At the time of injection of damping material, for example, a fixed quantity of the liquid substance may be continuously ejected from the injection gun 108 while the injection gun 108 is moved at a fixed speed along the entire groove 33 to complete a full circuit. At this time, in order for the tip of the injection gun 108 to be moved reliably along the groove 33, the shape and size of the groove 33 and its opening should be set so as to be able to guide the injection gun 108.

Figure 31:
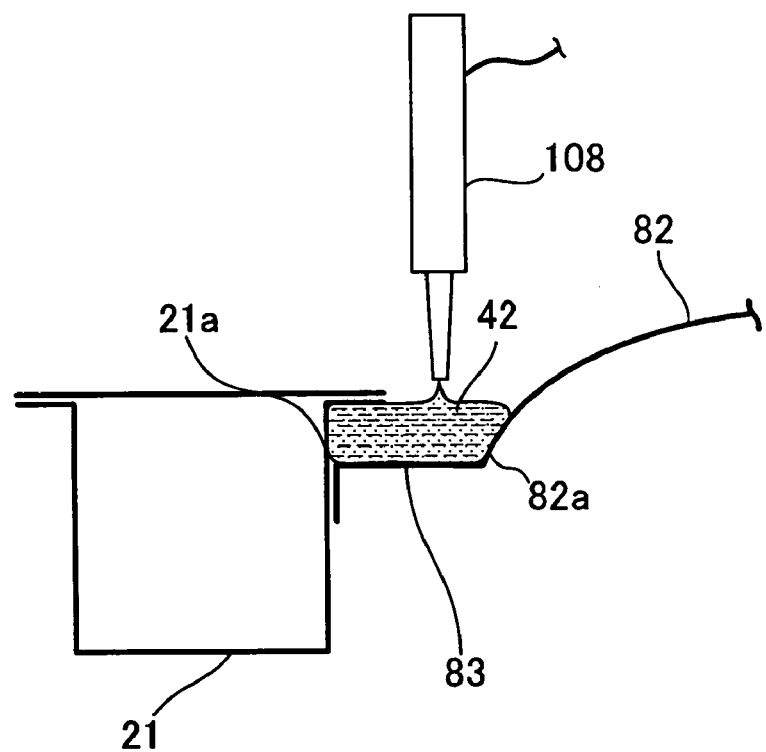
FIG. 31 is a partially enlarged sectional view of a floor panel used to describe a second method of installing damping material in the second and third embodiments.

FIG. 31 illustrates a second method of installing damping material according to second and third embodiments of the present invention by means of the second damping material installation method.

As shown in FIG. 31, after the planar area 83 and curved surface 82 are welded to the press-formed frame members, an injection gun 108 is used to coat the entire surface of the planar area 83 with liquid rubber or other liquid damping material 42. For example, the damping material 42 may be installed by flowing liquid into the groove-shaped portion formed by the side surface 21a of the side sill, the planar area 83 and the rising area 82a of the curved surface 82 which protrudes upward. In the aforementioned second and third embodiments, the planar area 83 is joined to the side surface of the frame member and the curved surface 82 is provided protruding upward, so the side surface 21a of the frame member, the planar area 83 and the rising area 82a of the curved surface 82 are formed in a groove shape, so they can be easily coated with liquid damping material. At the time of injection of damping material, for example, a fixed quantity of the liquid substance may be continuously ejected from the injection gun 108 while the injection gun 108 is moved at a fixed speed along the entire groove 33.

Note that in the case in which the planar area 83 is not formed as a groove, for example, if the planar area 83 is set as the same height as the upper surface of the frame member, or in the case that the curved surface 82 protrudes downward, it is sufficient to install damping material by applying foam rubber to the planar area 83, and thereafter foam the foam rubber in a subsequent step of drying coatings.

Figure 32:
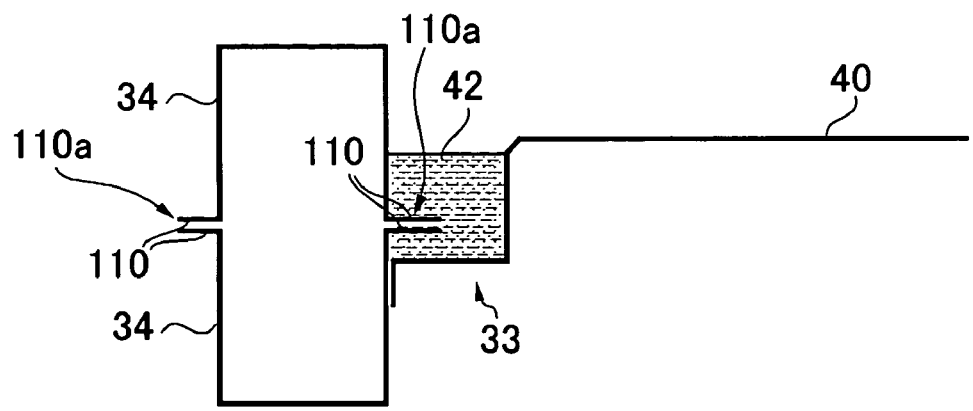
FIG. 32 is a partially enlarged sectional view of a floor panel used to describe a third method of installing damping material in the first embodiment.

The third damping material installation method illustrated in FIG. 32 applies to the case in which the frame members 34 have facing flanges 110, and these flanges 110 are connected to each other by welding, and these welded flanges 110 are positioned within the groove 33. Normally, the joints 110a of the flanges 110 connected by welding are filled with sealant used to prevent corrosion, but in this third example, liquid damping material 42 is injected into the floor side frames 22 with an injection gun, and the damping material (liquid substance) 42 covers the joints 110a of the flanges 110. Thereby, the damping material 42 can also serve the role of sealant for the joints 110a of the flanges 110.

Here, the damping material that can be used includes W-250 from Nihon Tokushu Toryo Co., Ltd. of Japan or EF3000 and 3300 from EFTEC North America, LLC of the US.

As described above, with the present invention, it is possible to reduce the amount of vibration transmitted from the frame members to the floor panel of a vehicle body, and also reduce noise within the cabin. Moreover, the vibration of the floor panel due to vibration transmitted from the frame members to the floor panel of a vehicle body can be greatly reduced with a smaller weight of damping material than used conventionally, so a reduction in noise within the cabin can be achieved and the vehicle weight can be reduced.

Although the present invention has been explained with reference to specific, preferred embodiments, one of ordinary skilled in the art will be recognize that modifications and improvements can be made while remaining within the scope of the appended claims.

What is claimed is:

1. A floor panel structure of a vehicle body where an vehicle floor has floor panels with peripheral edges thereof linked to a plurality of frame members that are disposed in a vehicle body lengthwise direction and a vehicle body crosswise direction and linked to an engine or a suspension, the floor panel comprising:
   a joint where at least part of one said peripheral edge thereof is joined to one said frame member;
   a low-rigidity area formed along the entire length of the joint; and
   a high-rigidity area formed within the low-rigidity area;
   wherein the low-rigidity area forms a vibration blocking area along the entire length of the joint by using a difference in rigidity from the high-rigidity area.

2. A floor panel structure of a vehicle body according to claim 1, wherein the joint of the floor panel is formed around the entire peripheral edge area of the floor panel and the low-rigidity area of the floor panel is formed continuously over the entire length of the joint.

3. A floor panel structure of a vehicle body according to claim 1, wherein a side area on the vehicle body inside of the floor panel is formed as a unit with a floor tunnel area protruding upward from the vehicle body.

4. A floor panel structure of a vehicle body according to claim 1, wherein the floor panel is formed such that the low-rigidity area is provided substantially adjacent to the joint.

5. A floor panel structure of a vehicle body according to claim 1, wherein the low-rigidity area of the floor panel is formed such that the rigidity thereof is substantially constant over the entire length of the joint with the frame member.

6. A floor panel structure of a vehicle body according to claim 1, wherein the low-rigidity area of the floor panel is formed in a linear manner corresponding to the frame member.

7. A floor panel structure of a vehicle body according to claim 1, wherein the floor panel further comprises damping material provided only in the low-rigidity area or only in the low-rigidity area and vicinity thereof.

8. A floor panel structure of a vehicle body according to claim 1, wherein the floor panel further comprises first damping material provided in the low-rigidity area of the floor panel, and second damping material provided in the high-rigidity area of the floor panel, the damping performance of the first damping material being greater than that of the second damping material.

9. A floor panel structure of a vehicle body according to claim 1, wherein the low-rigidity area of the floor panel is a groove or bead protruding downward, and the high-rigidity area of the floor panel is a flat panel area occupying the majority of the floor panel.

10. A floor panel structure of a vehicle body according to claim 1, wherein the vibration blocking area of the floor panel reduces the transmission of vibrations above a predetermined frequency, and the high-rigidity area of the floor panel has a vibration mode adjusting area that vibrates in a 2×1 vibration mode at a first specific frequency below the predetermined frequency so as to suppress the generation of acoustic emissions.

11. A floor panel structure of a vehicle body according to claim 10, wherein the predetermined frequency is approximately 200 Hz.

12. A floor panel structure of a vehicle body according to claim 10, wherein the low-rigidity area of the floor panel is a bead, the bead defines regions of the vibration mode adjusting area, and the vibration blocking area including the bead and the vibration mode adjusting area are formed as a unit.

13. A floor panel structure of a vehicle body according to claim 1, wherein the high-rigidity area of the floor panel is a curved surface formed protruding upwards or downwards, the low-rigidity area of the floor panel is a flat planar area, and damping material is provided only in the planar area of the floor panel.

14. A floor panel structure of a vehicle body according to claim 1, wherein the high-rigidity area of the floor panel is a curved surface formed protruding upwards or downwards, the low-rigidity area of the floor panel is a flat planar area, damping material is provided in the planar area and curved surface of the floor panel, and the damping material is provided in larger quantities upon the planar area than the curved surface.

15. A floor panel structure of a vehicle body according to claim 13, wherein the curved surface of the floor panel is formed such that a boundary thereof with the planar area is substantially circular or substantially elliptical in shape.

16. A floor panel structure of a vehicle body according to claim 13, wherein the curved surface of the floor panel is provided in a region enclosed by the plurality of frame members.

17. A floor panel structure of a vehicle body according to claim 13, wherein the curved surface and planar area of the floor panel functions as a vibration mode adjusting area that causes the region enclosed by the plurality of frame members to vibrate in a 2×1 vibration mode at a second specific frequency.

18. A floor panel structure of a vehicle body according to claim 17, wherein the second specific frequency is a tire cavity resonance frequency.

19. A floor panel structure of a vehicle body according to claim 17, wherein the second specific frequency is approximately 250 Hz.

20. A floor panel structure of a vehicle body according to claim 13, wherein the planar area of the floor panel is linked to the frame member or formed as a unit with a floor tunnel area, the curved surface of the floor panel is formed protruding upward, the side surface of the frame member or the rising area of the floor tunnel area, the planar area and the rising area of the curved surface are formed as groove shapes, and the interior of the groove shapes are coated with the damping material.

21. A floor panel structure of a vehicle body according to claim 20, wherein the damping material is respectively adhered to the side surface of the frame member or the rising area of the floor tunnel area, the planar area and the rising area of the curved surface.

22. A floor panel structure of a vehicle body according to claim 13, wherein sound-absorbing material is provided on the curved surface of the floor panel.

* * * * *